US008606842B2

(12) United States Patent
Kasahara et al.

(10) Patent No.: US 8,606,842 B2
(45) Date of Patent: Dec. 10, 2013

(54) N-DIGIT SUBTRACTION UNIT, N-DIGIT SUBTRACTION MODULE, N-DIGIT ADDITION UNIT AND N-DIGIT ADDITION MODULE

(75) Inventors: Hiroshi Kasahara, Tokyo (JP); Tsugio Nakamura, Tokyo (JP); Jin Sato, Tokyo (JP)

(73) Assignee: Tokyo Denki University, Tokyo (JP)

( * ) Notice: Subject to any disclaimer, the term of this patent is extended or adjusted under 35 U.S.C. 154(b) by 1502 days.

(21) Appl. No.: 12/196,002

(22) Filed: Aug. 21, 2008

(65) Prior Publication Data
US 2009/0313315 A1 Dec. 17, 2009

(30) Foreign Application Priority Data

Jun. 11, 2008 (JP) ................................. 2008-153259

(51) Int. Cl.
*G06F 7/50* (2006.01)
(52) U.S. Cl.
USPC ........... 708/700; 708/629; 708/630; 708/707; 708/708
(58) Field of Classification Search
USPC .................. 708/700, 706, 708, 707, 630, 629
See application file for complete search history.

(56) References Cited

U.S. PATENT DOCUMENTS

| 3,805,045 A | 4/1974 | Larsen |
| 4,685,079 A * | 8/1987 | Armer ........................... 708/707 |
| 4,811,195 A * | 3/1989 | Evans ............................... 700/4 |
| 5,047,976 A | 9/1991 | Goto et al. |
| 5,097,436 A | 3/1992 | Zurawski |
| 6,199,090 B1 | 3/2001 | Mansingh et al. |
| 7,991,820 B1 * | 8/2011 | Sohay ............................ 708/700 |

FOREIGN PATENT DOCUMENTS

| JP | 01-093821 | 4/1989 |
| JP | 09-258960 | 10/1997 |
| JP | 11-212765 | 8/1999 |

OTHER PUBLICATIONS

Office Action for JP 2008-153259, mailed Jul. 24, 2012.
Namiki, "Digital Circuits and Verilog HDL", ISBN 978-4-7741-3357-7, Feb. 2008, pp. 404-411, 429-431 (with English translation).
Hwang, K., "Computer Arithmetic—Principles, Architecture and Design", John Wiley & Sons, Inc., pp. 89-92, 1979.
Nakamura, T., "Basis of Digital Circuit", NRS, pp. 135-139, 1992.
Nakamura, et al., "Super-High Speed, Accuracy, and Modularized Residue Number System Based on Redundant Binary Representation", *IEEJ Trans. EIS*, vol. 125, No. 6, pp. 879-886, 2005.
Tsunekawa, et al., "High-Performance Redundant Binary Adder Representing Each Digit by Hybrid 2 Bits/3 Bits and its Application to Multiplier", *T. IEE Japan*, vol. 119-C, No. 5, pp. 664-653, 1999.

\* cited by examiner

*Primary Examiner* — Chat Do
*Assistant Examiner* — Jae Jeon
(74) *Attorney, Agent, or Firm* — Foley & Lardner LLP

(57) ABSTRACT

Provided are N-digit addition and subtraction units and N-digit addition and subtraction modules in which borrowing and carrying are not propagated in modules having basic digits. In the units and modules, an output pattern of results of addition and subtraction is predicted based on a relation between an augend and an addend and a relation between a minuend and a subtrahend, respectively, thereby preventing borrowing and carrying from being propagated in modules having basic digits.

17 Claims, 22 Drawing Sheets

Fig. 2

TABLE 1. TRUTH TABLE FOR ONE-DIGIT SUBTRACTER

| INPUT | | | OUTPUT | |
|---|---|---|---|---|
| BORROWING FROM LOWER DIGIT | UPPER DIGIT | LOWER DIGIT | BORROWING FROM UPPER DIGIT | LOWEST DIGIT |
| | MINUEND | SUBTRAHEND | | |
| $B_{in}$ | X | Y | $B_{out}$ | Out |
| 0 | 0 | 0 | 0 | 0 |
| 0 | 0 | 1 | 1 | 1 |
| 0 | 1 | 0 | 0 | 1 |
| 0 | 1 | 1 | 0 | 0 |
| 1 | 0 | 0 | 1 | 1 |
| 1 | 0 | 1 | 1 | 0 |
| 1 | 1 | 0 | 0 | 0 |
| 1 | 1 | 1 | 1 | 1 |

Fig. 3

TABLE 2. TRUTH TABLE FOR TWO-DIGIT SUBTRACTER

| | BORROWING FROM LOWER DIGIT | UPPER DIGIT | | LOWER DIGIT | | BORROWING FROM UPPER DIGIT | UPPER DIGIT | LOWEST DIGIT |
|---|---|---|---|---|---|---|---|---|
| | | MINUEND | SUBT-RAHEND | MINUEND | SUBT-RAHEND | | | |
| | $B_{in}$ | X1 | Y1 | X0 | Y0 | $B_{out}$ | Out1 | Out0 |
| A | 0 | 0 | 0 | 0 | 0 | 0 | 0 | 0 |
| B | 0 | 0 | 0 | 0 | 1 | 1 | 1 | 1 |
| C | 0 | 0 | 0 | 1 | 0 | 0 | 0 | 1 |
| D | 0 | 0 | 0 | 1 | 1 | 0 | 0 | 0 |
| E | 0 | 0 | 1 | 0 | 0 | 1 | 1 | 0 |
| F | 0 | 0 | 1 | 0 | 1 | 1 | 0 | 1 |
| G | 0 | 0 | 1 | 1 | 0 | 1 | 1 | 1 |
| H | 0 | 0 | 1 | 1 | 1 | 1 | 1 | 0 |
| I | 0 | 1 | 0 | 0 | 0 | 0 | 1 | 0 |
| J | 0 | 1 | 0 | 0 | 1 | 0 | 0 | 1 |
| K | 0 | 1 | 0 | 1 | 0 | 0 | 1 | 1 |
| L | 0 | 1 | 0 | 1 | 1 | 0 | 1 | 0 |
| M | 0 | 1 | 1 | 0 | 0 | 0 | 0 | 0 |
| N | 0 | 1 | 1 | 0 | 1 | 1 | 1 | 1 |
| O | 0 | 1 | 1 | 1 | 0 | 0 | 0 | 1 |
| P | 0 | 1 | 1 | 1 | 1 | 0 | 0 | 0 |
| P' | 1 | 0 | 0 | 0 | 0 | 1 | 1 | 1 |
| O' | 1 | 0 | 0 | 0 | 1 | 1 | 1 | 0 |
| N' | 1 | 0 | 0 | 1 | 0 | 0 | 0 | 0 |
| M' | 1 | 0 | 0 | 1 | 1 | 1 | 1 | 1 |
| L' | 1 | 0 | 1 | 0 | 0 | 1 | 0 | 1 |
| K' | 1 | 0 | 1 | 0 | 1 | 1 | 0 | 0 |
| J' | 1 | 0 | 1 | 1 | 0 | 1 | 1 | 0 |
| I' | 1 | 0 | 1 | 1 | 1 | 1 | 0 | 1 |
| H' | 1 | 1 | 0 | 0 | 0 | 0 | 0 | 1 |
| G' | 1 | 1 | 0 | 0 | 1 | 0 | 0 | 0 |
| F' | 1 | 1 | 0 | 1 | 0 | 0 | 1 | 0 |
| E' | 1 | 1 | 0 | 1 | 1 | 0 | 0 | 1 |
| D' | 1 | 1 | 1 | 0 | 0 | 1 | 1 | 1 |
| C' | 1 | 1 | 1 | 0 | 1 | 1 | 1 | 0 |
| B' | 1 | 1 | 1 | 1 | 0 | 0 | 0 | 0 |
| A' | 1 | 1 | 1 | 1 | 1 | 1 | 1 | 1 |

Fig. 5

TABLE 3. REGULARITY FOR INPUT/OUTPUT IN TWO-DIGIT SUBTRACTER

| UPPER DIGIT | | LOWER DIGIT | | OUTPUT | | |
|---|---|---|---|---|---|---|
| MINUEND | SUBTRAHEND | MINUEND | SUBTRAHEND | | | |
| X1 | Y1 | X0 | Y0 | Bout | Out1 | Out0 |
| 0 | 0 | 0 | 0 | 0 | 0 | 0 |
| 0 | 0 | 0 | 1 | 1 | 1 | 1 |
| 0 | 0 | 1 | 0 | 0 | 0 | 1 |
| 0 | 0 | 1 | 1 | 0 | 0 | 0 |
| 0 | 1 | 0 | 0 | 1 | 1 | 0 |
| 0 | 1 | 0 | 1 | 1 | 0 | 1 |
| 0 | 1 | 1 | 0 | 1 | 1 | 1 |
| 0 | 1 | 1 | 1 | 1 | 1 | 0 |
| 1 | 0 | 0 | 0 | 0 | 1 | 0 |
| 1 | 0 | 0 | 1 | 0 | 0 | 1 |
| 1 | 0 | 1 | 0 | 0 | 1 | 1 |
| 1 | 0 | 1 | 1 | 0 | 1 | 0 |
| 1 | 1 | 0 | 0 | 0 | 0 | 0 |
| 1 | 1 | 0 | 1 | 1 | 1 | 1 |
| 1 | 1 | 1 | 0 | 0 | 0 | 1 |
| 1 | 1 | 1 | 1 | 0 | 0 | 0 |

Bout groupings: SAME AS THE RIGHT / ALL 1 / ALL 0 / SAME AS THE RIGHT

Out1 groupings: NORMAL / INVERSION / INVERSION / INVERSION = NORMAL

Out0 groupings: HAVING THE SAME PATTERN

HERE VIEW FOR DETERMINATION OF FOUR BLOCK DIVISION.

Fig.11

TABLE 4, TRUTH TABLE OF TWO-DIGIT ADDITION

| | INPUT | | | | | OUTPUT | | |
|---|---|---|---|---|---|---|---|---|
| | CARRYING FROM LOWER DIGIT | UPPER DIGIT | | LOWER DIGIT | | CARRYING TO UPPER DIGIT | UPPER DIGIT | LOWER DIGIT |
| | | AUGEND | ADDEND | AUGEND | ADDEND | | | |
| | $C_{in}$ | X1 | Y1 | X0 | Y0 | | $C_{out}$ | Out1 | Out0 |
| A | 0 | 0 | 0 | 0 | 0 | | 0 | 0 | 0 |
| B | 0 | 0 | 0 | 0 | 1 | | 0 | 0 | 1 |
| C | 0 | 0 | 0 | 1 | 0 | | 0 | 0 | 1 |
| D | 0 | 0 | 0 | 1 | 1 | | 0 | 1 | 0 |
| E | 0 | 0 | 1 | 0 | 0 | | 0 | 1 | 0 |
| F | 0 | 0 | 1 | 0 | 1 | | 0 | 1 | 1 |
| G | 0 | 0 | 1 | 1 | 0 | | 0 | 1 | 1 |
| H | 0 | 0 | 1 | 1 | 1 | | 1 | 0 | 0 |
| I | 0 | 1 | 0 | 0 | 0 | | 0 | 1 | 0 |
| J | 0 | 1 | 0 | 0 | 1 | | 0 | 1 | 1 |
| K | 0 | 1 | 0 | 1 | 0 | | 0 | 1 | 1 |
| L | 0 | 1 | 0 | 1 | 1 | | 1 | 0 | 0 |
| M | 0 | 1 | 1 | 0 | 0 | | 1 | 0 | 0 |
| N | 0 | 1 | 1 | 0 | 1 | | 1 | 0 | 1 |
| O | 0 | 1 | 1 | 1 | 0 | | 1 | 0 | 1 |
| P | 0 | 1 | 1 | 1 | 1 | | 1 | 1 | 0 |
| P' | 1 | 0 | 0 | 0 | 0 | | 0 | 0 | 1 |
| O' | 1 | 0 | 0 | 0 | 1 | | 0 | 1 | 0 |
| N' | 1 | 0 | 0 | 1 | 0 | | 0 | 1 | 0 |
| M' | 1 | 0 | 0 | 1 | 1 | | 0 | 1 | 1 |
| L' | 1 | 0 | 1 | 0 | 0 | | 0 | 1 | 1 |
| K' | 1 | 0 | 1 | 0 | 1 | | 1 | 0 | 0 |
| J' | 1 | 0 | 1 | 1 | 0 | | 1 | 0 | 0 |
| I' | 1 | 0 | 1 | 1 | 1 | | 1 | 0 | 1 |
| H' | 1 | 1 | 0 | 0 | 0 | | 0 | 1 | 1 |
| G' | 1 | 1 | 0 | 0 | 1 | | 1 | 0 | 0 |
| F' | 1 | 1 | 0 | 1 | 0 | | 1 | 0 | 0 |
| E' | 1 | 1 | 0 | 1 | 1 | | 1 | 0 | 1 |
| D' | 1 | 1 | 1 | 0 | 0 | | 1 | 0 | 1 |
| C' | 1 | 1 | 1 | 0 | 1 | | 1 | 1 | 0 |
| B' | 1 | 1 | 1 | 1 | 0 | | 1 | 1 | 0 |
| A' | 1 | 1 | 1 | 1 | 1 | | 1 | 1 | 1 |

Fig.12

TABLE 5. REGULARITY OF TRUTH TABLE FOR TWO-DIGIT ADDITION

| | INPUT | | | | OUTPUT | | |
|---|---|---|---|---|---|---|---|
| | UPPER DIGIT | | LOWER DIGIT | | CARRYING TO UPPER DIGIT | UPPER DIGIT | LOWEST DIGIT |
| | AUGEND | ADDEND | AUGEND | ADDEND | | | |
| | X1 | Y1 | X0 | Y0 | Cout | Out1 | Out0 |
| A | 0 | 0 | 0 | 0 | 0 | 0 | 0 |
| B | 0 | 0 | 0 | 1 | 0 | 0 | 1 |
| C | 0 | 0 | 1 | 0 | 0 | 0 | 1 |
| D | 0 | 0 | 1 | 1 | 0 | 1 | 0 |
| E | 0 | 1 | 0 | 0 | 0 | 1 | 0 |
| F | 0 | 1 | 0 | 1 | 0 | 1 | 1 |
| G | 0 | 1 | 1 | 0 | 0 | 1 | 1 |
| H | 0 | 1 | 1 | 1 | 1 | 0 | 0 |
| I | 1 | 0 | 0 | 0 | 0 | 1 | 0 |
| J | 1 | 0 | 0 | 1 | 0 | 1 | 1 |
| K | 1 | 0 | 1 | 0 | 0 | 1 | 1 |
| L | 1 | 0 | 1 | 1 | 1 | 0 | 0 |
| M | 1 | 1 | 0 | 0 | 1 | 0 | 0 |
| N | 1 | 1 | 0 | 1 | 1 | 0 | 1 |
| O | 1 | 1 | 1 | 0 | 1 | 0 | 1 |
| P | 1 | 1 | 1 | 1 | 1 | 1 | 0 |

Fig. 15

TABLE 6. DELAY COMPARISON WITH OTHER SCHEMES

| NUMBER OF BITS [BIT] | PREDICTION OF REGULARITY | BORROW PROPAGATION | BLOCK LOOKAHEAD BORROW |
|---|---|---|---|
| 8 | 16.643 | 22.868 | 9.253 |
| 16 | 29.010 | 39.359 | 12.115 |
| 32 | 53.745 | 72.341 | 17.839 |
| 64 | 103.215 | 138.306 | 29.287 |

*Fig. 16*

TABLE 7. GATE NUMBER COMPARISON WITH OTHER SCHEMES

| BIT NUMBER [BIT] | PREDICTION OF REGULARITY | BORROW PROPAGATION | BLOCK LOOKAHEAD BORROW |
|---|---|---|---|
| 8 | 96 | 108 | 264 |
| 16 | 192 | 216 | 528 |
| 32 | 384 | 444 | 1,056 |
| 64 | 768 | 948 | 2,112 |

Fig. 19

TABLE 8. DELAY COMPARISON IN CASE OF NO MODULARIZATION

| BIT NUMBER [BIT] | PREDICTION OF REGULARITY | BORROW PROPAGATION | LOOKAHEAD BORROW |
|---|---|---|---|
| 4 | 10.714 | 14.622 | 7.845 |
| 8 | 16.643 | 22.868 | 9.185 |
| 16 | 28.057 | 39.359 | 10.945 |
| 32 | 50.766 | 72.341 | — |
| 64 | 95.262 | 138.31 | — |

Fig.20

TABLE 9. GATE NUMBER COMPARISON IN CASE OF NO MODULARIZATION

| BIT NUMBER [BIT] | PREDICTION OF REGULARITY | BORROW PROPAGATION | LOOKAHEAD BORROW |
|---|---|---|---|
| 4 | 48 | 54 | 132 |
| 8 | 96 | 108 | 378 |
| 16 | 192 | 216 | 2322 |
| 32 | 384 | 444 | — |
| 64 | 768 | 948 | — |

US 8,606,842 B2

N-DIGIT SUBTRACTION UNIT, N-DIGIT SUBTRACTION MODULE, N-DIGIT ADDITION UNIT AND N-DIGIT ADDITION MODULE

CROSS-REFERENCES TO RELATED APPLICATIONS

The entire disclosure of Japanese Patent Application No. 2008-153259, filed on Jun. 11, 2008, is expressly incorporated herein by reference.

BACKGROUND

1. Technical Field

The present invention relates to an N-digit subtraction unit, an N-digit subtraction module, an N-digit addition unit and an N-digit addition module.

2. Related Art

An operator such as an adder and a subtracter, which are basic devices for arithmetic operation, has been designed in various ways depending on its use (Kai Hwang: "Computer Arithmetic-PRINCIPLES, ARCHITECTURE AND DESIGN", John Wiley & Sons, Inc (1979): Non-Patent Document 1). For example, a carry propagation scheme has been most commonly used for arithmetic operation. In this scheme, since carry is propagated among digits, a propagation delay and the number (area) of gates are in proportion to digits (Tsugio Nakamura, "Basis of Digital Circuit", NRS, 1992: Non-Patent Document 2).

A redundant binary representation method, which provides the highest-speed for arithmetic operation, requires a number of gates since one digit is represented by two bits (Tsugio Nakamura, Kazuhiro Abe, Narito Fuyutsume, Hiroshi Kasahara, and Teruo Tanaka: "Super-high Speed, Accuracy, and Modularized Residue Number System based on Redundant Binary Representation", IEEJ Trans.EIS, Vol. 125, No. 6, pp. 879-886 (2005): Non-Patent Document 3)(Yoshitaka Tsunekawa, Mitsuki Hinosugi, Masato Saito, Katsumi Abukawa, and Mamoru Miura: "High-Performance Redundant Binary Adder Representing Each Digit by Hybrid 2 Bits/3 Bits and Its Application to Multiplier", T.IEE Japan, Vol. 119-C, No. 5, pp. 644-653 (1999): Non-Patent Document 4). A lookahead carry scheme allows relatively high-speed processing since it performs a carry/borrow operation in addition to an adding operation, but this scheme is not suitable for increase of area and distributed processing for the increased number of digits. In addition, there is a Non-Patent Document disclosing a conventional technique, authored by Yoshitaka Tsunekawa, Mitsuki Hinosugi, Masato Saito, Katsumi Abukawa, and Mamoru Miura, "High-Performance Redundant Binary Adder Representing Each Digit by Hybrid 2 Bits/3 Bits and Its Application to Multiplier", T.IEE Japan, Vol. 119-C, No. 5, pp. 644-653 (1999).

SUMMARY

It is an object of the invention to provide an N-digit subtraction unit, an N-digit subtraction module, an N-digit addition unit and an N-digit addition module, in which an output pattern of a subtraction result from a relation between a minuend and a subtrahend and an output pattern of an addition result from a relation between an augend and an addend are predicted on the basis of the regularity of addition and subtraction, and borrow is not propagated in a module of basic digits.

According to an aspect of the invention, there is provided an N-digit subtraction unit including: a first-digit subtraction circuit including a logic circuit for outputting an upper borrowing output Bout(0) as 0, 1, 0 and 0 in order, to an upper second-digit for combinations (0,0), (0,1), (1,0) and (1,1), of inputs of a first-digit minuend X0 and a first-digit subtrahend Y0, and an exclusive OR circuit for outputting 0, 1, 1 and 0 as first-digit outputs Out0 in order in an exclusive OR logic for combinations (0,0), (0,1), (1,0) and (1,1), of inputs of the first-digit minuend X0 and the first-digit subtrahend Y0; and an upper-digit subtraction circuit including a borrowing circuit for outputting 1 for borrowing from an upper $(i+1)^{th}$-digit ($i$ is 2 or more) and 0 for no borrowing from the $(i+1)^{th}$-digit as upper borrowing outputs Bout(i−1) in order of 0, 1, 1, 1, 0, 0, 0, 1 for combinations, (0,0,0), (0,0,1), (0,1,0), ..., (1,1,0), and (1,1,1) of inputs of an $i^{th}$-digit minuend Xi−1 and an $i^{th}$-digit subtrahend Yi−1 ($i$ is 2 or more) and an input of a borrowing bit to input 1 for the borrowing output Bout(i−2) from a lower $(i−1)^{th}$-digit and 0 for no borrowing output Bout(i−2), and a 3-input exclusive OR circuit for outputting an $i^{th}$-digit output Outi−1, which is an exclusive OR logic, with inputs of the $i^{th}$-digit minuend Xi−1, the $i^{th}$-digit subtrahend Yi−1 and the borrowing output Bout(i−2) from the borrowing circuit of the lower $(i−1)^{th}$-digit, wherein, for (N−1) digits from second-digit to $N^{th}$-digit (N is any), (N−1) above upper-digit subtraction circuits are cascaded, the first-digit subtraction circuit is connected to the second-digit subtraction circuit such that the output Bout(0) in the first-digit subtraction circuit becomes a borrowing bit input of the borrowing circuit in the second-digit subtraction circuit, and an upper borrowing output Bout(N−1) in the upper $N^{th}$ upper-digit subtraction circuit becomes a borrowing output Bout of the N-digit subtracter.

In the N-digit subtraction unit, 4-digit subtraction unit is constituted by connecting three upper-digit subtraction circuits to the first-digit subtraction circuit in a cascaded fashion.

In the N-digit subtraction unit, 8-digit subtraction unit is constituted by connecting seven upper-digit subtraction circuits to the first-digit subtraction circuit in a cascaded fashion.

According to another aspect of the invention, there is provided an N-digit subtraction module including: an N-digit subtraction unit including a first-digit subtraction circuit including a logic circuit for outputting an upper borrowing output Bout(0) as 0, 1, 0 and 0 in order, to an upper second-digit for combinations (0,0), (0,1), (1,0) and (1,1), of inputs of a first-digit minuend X0 and a first-digit subtrahend Y0, and an exclusive OR circuit for outputting 0, 1, 1 and 0 as first-digit outputs Out0 in order in an exclusive OR logic for combinations, (0,0), (0,1), (1,0) and (1,1), of inputs of the first-digit minuend X0 and the first-digit subtrahend Y0, and an upper-digit subtraction circuit including a borrowing circuit for outputting 1 for borrowing from an upper $(i+1)^{th}$-digit and 0 for no borrowing from the $(i+1)^{th}$-digit as upper borrowing outputs Bout(i−1) in order of 0, 1, 1, 1, 0, 0, 0, 1 for combinations, (0,0,0), (0,0,1), (0,1,0), ..., (1,1,0), and (1,1,1) of inputs of an $i^{th}$-digit minuend Xi−1 and an $i^{th}$-digit subtrahend Yi−1 ($i$ is 2 or more) and an input of a borrowing bit to input 1 for the borrowing output Bout(i−2) from a lower $(i−1)^{th}$-digit and 0 for no borrowing output Bout(i−2), and a 3-input exclusive OR circuit for outputting an $i^{th}$-digit output Outi−1, which is an exclusive OR logic, with inputs of the $i^{th}$-digit minuend Xi−1, the $i^{th}$-digit subtrahend Yi−1 and the borrowing output Bout(i−2) from the borrowing circuit of the lower $(i−1)^{th}$-digit, wherein, for (N−1) digits from second-digit to $N^{th}$-digit (N is any), (N−1) above upper-digit subtraction circuits are cascaded, the first-digit subtraction circuit is connected to the second-digit subtraction circuit such that the output Bout(0) in the first-digit subtraction circuit becomes a borrowing bit input of the borrowing circuit in the second-digit subtraction circuit, and an upper borrowing output Bout (N−1) in the upper $N^{th}$ upper-digit subtraction circuit becomes a borrowing output Bout of the N-digit subtracter; 2N input side exclusive OR circuits, each of which has each of an $i^{th}$-digit minuend Xi−1 and an $i^{th}$-digit subtrahend Yi−1 (i is 1 to N) as one input and a borrowing bit input Bin provided to a borrowing terminal from the outside as the other input, and whose exclusive OR output becomes an input of the minuend Xi−1 and subtrahend Yi−1 of the N-digit subtraction unit; and output side exclusive OR circuits, each of which has each of an $i^{th}$-digit output Outi−1 and an upper digit borrowing output Bout(i−1) of the N-digit subtraction unit as one input and a borrowing bit input Bin provided to a borrowing terminal from the outside as the other input and whose exclusive OR output becomes the output Outi−1 and Bout(i−1) of borrowing bits to the $i^{th}$-digit and upper-digits.

According to still another aspect of the invention, there is provided an N-digit addition unit including: a first-digit addition circuit including an AND circuit for outputting an upper carrying output Bout(0) of 0, 0, 0 and 1 in order, to an upper second-digit in an AND logic for combinations (0,0), (0,1), (1,0) and (1,1), of inputs of a first-digit augend X0 and a first-digit addend Y0, and an exclusive OR circuit for outputting 0, 1, 1 and 0 as first-digit outputs Out0 in order in an exclusive OR logic for combinations (0,0), (0,1), (1,0) and (1,1), of inputs of the first-digit augend X0 and the first-digit addend Y0; and an upper-digit adder circuit including a carrying circuit for outputting 1 for carrying to an upper $(i+1)^{th}$-digit and 0 for no carrying to the $(i+1)^{th}$-digit as upper carrying outputs Bout(i−1) in order of 0, 0, 0, 1, 0, 1, 1, 1 for combinations (0,0,0), (0,0,1), (0,1,0), ..., (1,1,0), and (1,1,1) of inputs of an $i^{th}$-digit augend Xi−1 and an $i^{th}$-digit addend Yi−1 (i is 2 or more) and an input of a carrying bit to input 1 for the carrying output Bout(i−2) from a lower $(i−1)^{th}$-digit and 0 for no carrying output Bout(i−2), and a 3-input exclusive OR circuit for outputting an $i^{th}$-digit output Outi−1, which is an exclusive OR logic, with inputs of the $i^{th}$-digit augend Xi−1, the $i^{th}$-digit addend Yi−1 and the carrying output Bout(i−2) from the carrying circuit of the lower $(i−1)^{th}$-digit, wherein, for (N−1) digits from second-digit to $N^{th}$-digit (N is any), (N−1) above upper-digit addition circuits are cascaded, the first-digit addition circuit is connected to the second-digit addition circuit such that the output Bout(0) in the first-digit addition circuit becomes a carrying bit input of the carrying circuit in the second-digit addition circuit, and an upper carrying output Bout(N−1) in the $N^{th}$ upper-digit addition circuit becomes a carrying output Bout of the N-digit adder.

In the N-digit addition unit, 4-digit addition unit is constituted by connecting three upper-digit addition circuits to the first-digit addition circuit in a cascaded fashion.

In the N-digit addition unit, 8-digit addition unit is constituted by connecting seven upper-digit addition circuits to the first-digit addition circuit in a cascaded fashion.

According to still another aspect of the invention, there is provided an N-digit addition module including: an N-digit addition unit including a first-digit addition circuit including an AND circuit for outputting an upper carrying output Bout (0) of 0, 0, 0 and 1 in order, to an upper second-digit in an AND logic for combinations (0,0), (0,1), (1,0) and (1,1), of inputs of a first-digit augend X0 and a first-digit addend Y0, and an exclusive OR circuit for outputting 0, 1, 1 and 0 as first-digit outputs Out0 in order in an exclusive OR logic for combinations (0,0), (0,1), (1,0) and (1,1), of inputs of the first-digit augend X0 and the first-digit addend Y0, and an upper-digit adder circuit including a carrying circuit for outputting 1 for carrying to an upper $(i+1)^{th}$-digit and 0 for no carrying to the $(i+1)^{th}$-digit as upper carrying outputs Bout (i−1) in order of 0, 0, 0, 1, 0, 1, 1, 1 for combinations (0,0,0), (0,0,1), (0,1,0), ..., (1,1,0), and (1,1,1) of inputs of an $i^{th}$-digit augend Xi−1 and an $i^{th}$-digit addend Yi−1 (i is 2 or more) and an input of a carrying bit to input 1 for the carrying output Bout(i−2) from a lower $(i−1)^{th}$-digit and 0 for no carrying output Bout(i−2), and a 3-input exclusive OR circuit for outputting an $i^{th}$-digit output Outi−1, which is an exclusive OR logic, with inputs of the $i^{th}$-digit augend Xi−1, the $i^{th}$-digit addend Yi−1 and the carrying output Bout(i−2) from the carrying circuit of the lower $(i−1)^{th}$-digit, wherein, for (N−1) digits from second-digit to $N^{th}$-digit (N is any), (N−1) $i^{th}$-digit addition circuits are cascaded, the first-digit addition circuit is connected to the second-digit addition circuit such that the output Bout(0) in the first-digit addition circuit becomes a carrying bit input of the carrying circuit in the second-digit addition circuit, and an upper carrying output Bout(N−1) in the $N^{th}$ upper-digit addition circuit is a carrying output Bout of the N-digit addition unit; 2N input side exclusive OR circuits, each of which has each of an $i^{th}$-digit augend Xi−1 and an $i^{th}$-digit addend Yi−1 (i is 1 to N) as one input and a carrying bit input Bin provided to a carrying terminal from the outside as the other input and whose exclusive OR output becomes an input of the augend Xi−1 and addend Yi−1 of the N-digit addition unit; and output side exclusive OR circuits, each of which has each of an $i^{th}$-digit output Outi−1 and an upper digit carrying output Bout(i−1) of the N-digit addition unit as one input and a carrying bit input Bin provided to a carrying terminal from the outside as the other input and whose exclusive OR output becomes the output Outi−1 and Bout of carrying bits to the $i^{th}$-digit and upper-digits.

The present invention provides addition and subtraction units which are inferior to a lookahead carry scheme, superior to a carry propagation scheme in an operation speed, and are capable of suppressing the number of gates and flexibly coping with increase of the number of arithmetic digits as compared to these schemes, and addition and subtraction modules including the addition and subtraction units and their peripheral circuits.

BRIEF DESCRIPTION OF THE DRAWINGS

FIG. 2 is a view showing truth table 1 of a one-digit subtracter.

FIG. 3 is a view showing truth table 2 of a two-digit subtracter.

FIG. 5 is a view showing regularity table 3 for input/output in a two-digit subtracter.

FIG. 11 is a view showing truth table 4 applied to a two-digit adder.

FIG. 12 is a view showing regularity table 5 for input/output in a two-digit adder.

FIG. 15 is a view showing comparison table 6 for delay of a subtracter according to an example of the present invention to a different subtracter.

FIG. 16 is a view showing comparison table 7 for the number of gates of a subtracter according to an example of the present invention to a different subtracter.

FIG. 19 is a view showing comparison table 8 of delay of a subtracter according to an example of the present invention to a different subtracter in case of no modularization.

FIG. 20 is a view showing comparison table 9 of the number of gates of a subtracter according to an example of the present invention to a different subtracter in case of no modularization.

DESCRIPTION OF EXEMPLARY EMBODIMENTS

Hereinafter, exemplary embodiments of the present invention will be described with reference to the drawings.

Figure 1:
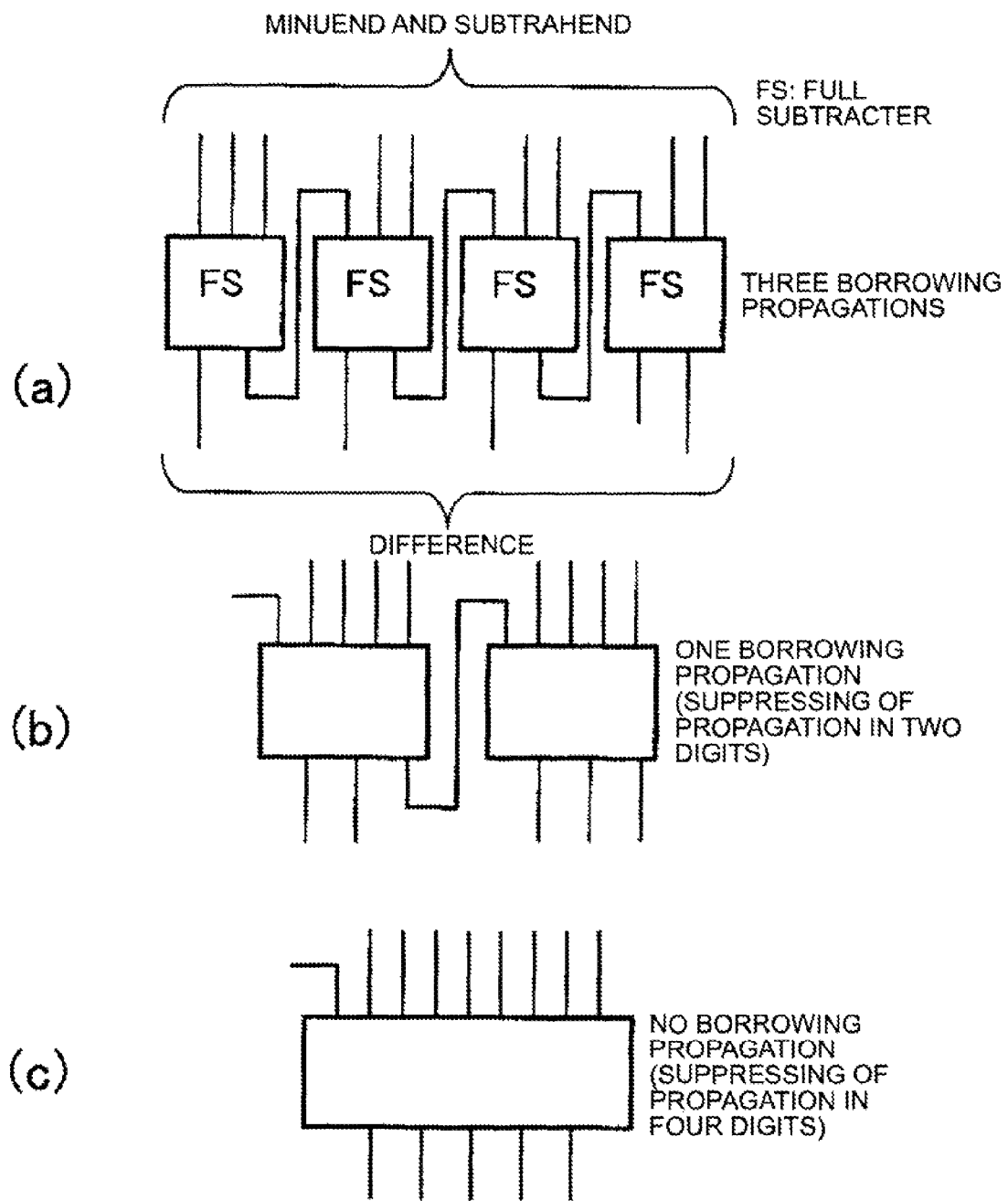
FIG. 1 is a block diagram of a subtracter for explaining the principle of the present invention.

First, the principle of the present invention will be described. The most common subtracter is of a borrowing propagation type shown in FIG. 1A. In the subtracter of this type, digits are subjected to subtraction in parallel. In the figure, since borrowing from a left digit to a right digit is propagated between the digits, borrowing propagation from the least significant digit has to be awaited in order to cause a circuit of the most significant digit to output a result. This may cause a big delay. Thus, if the 4-bit subtraction circuit shown in FIG. 1A is modularized into the two-bit subtraction circuit shown in FIG. 1B, the number of borrowing propagations can be one. In addition, as shown in FIG. 1C, modularization of all four digits can alleviate internal borrowing propagation. In this manner, when plural digits are simultaneously processed in modularized subtraction circuits, that is, a multi-staged subtraction module, rather than calculating digits one by one, it is possible to reduce a delay time of borrowing propagation and hence achieve a high-speed operation.

A subtraction module of the present invention predicts an output result from a minuend and a subtrahend, not calculating digits one by one with a digit being propagated to an upper digit in the event of borrowing. For example, a 4-digit subtracter outputs 00110 for inputs of a minuend 1001 and a subtrahend 0011 since a difference between the inputs is 1001-0011. In this manner, the 4-digit subtracter predicts outputs for all combination of four sets of the minuend and subtrahend and 8 binary input values 00000000 to 11111111, without causing borrowing, thereby achieving a high-speed operation.

However, such a simple circuit configuration method may increase a scale of circuit with increase of the number of digits of the circuit, thereby making it difficult to design the circuit. However, considering a relation between all inputs/outputs of one to 4-digit subtracters, regularities for increase of inputs/outputs with increase of digits may be found. The use of such regularities may alleviate difficulty of a design due to circuit complexity. The regularities of truth tables for subtraction will be described below.

[First Embodiment]

A two-digit subtraction module MD(2) and a two-digit subtraction unit UN(2) used for the same according to a first embodiment of the present invention will now be described.

<Relation Between Input and Output in Two-Digit Subtraction>

The following regularities may be found from observation of truth tables for one and two-digit subtracters.

(1) Input and output of a subtracter for borrowing "0" are all inverted to ones for borrowing "1."

The regularity of a pattern common to Table 1 of FIG. 2, which is a truth table of a one-digit subtracter, and Table 2 of FIG. 3, which is a truth table of a two-digit subtracter will be now described. Symbols A to P are allocated to portions where borrowing Bin of input/output in Table 2 is 0. Next, in symmetry thereto, symbols P' to A' are allocated to portions where borrowing Bin is 1. At this point, when viewing input/output two by two from the center in vertical symmetry, it can be seen that input/output each has a bit-inversion relation. One example may be given as follows.

$$P = 0\ 1\ 1\ 1\ 1\ 0\ 0\ 0$$

$$P' = 1\ 0\ 0\ 0\ 0\ 1\ 1\ 1 \qquad \text{[Mathematical Expression 1]}$$

Figure 4:
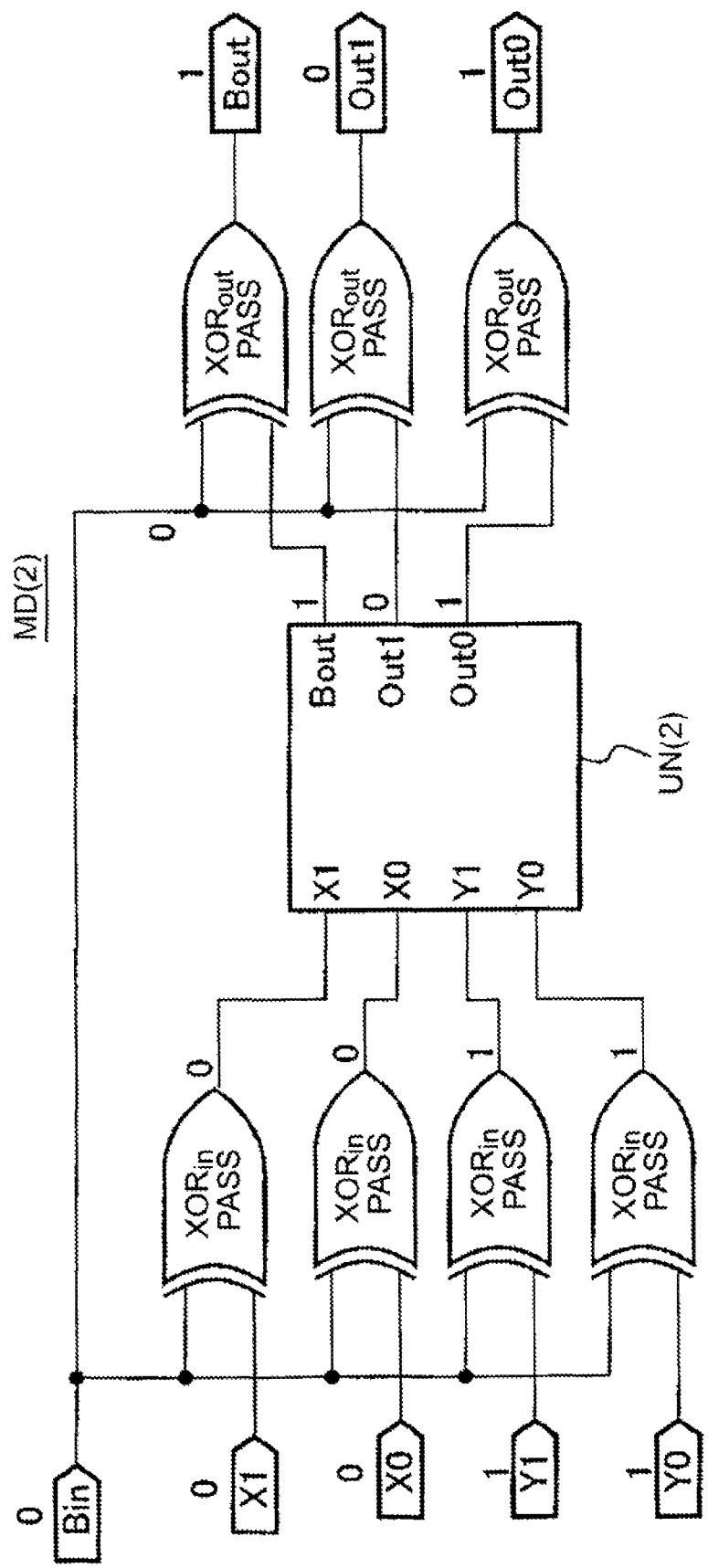
FIG. 4 is a block diagram of a two-digit subtraction module according to a first embodiment of the present invention.

Accordingly, since the lower half of Table 2 may be obtained by inversion of the upper half thereof and borrowing Bin from a lower digit is divided into 0 and 1, as shown in FIG. 4, a scale of the truth table put in a two-digit subtraction unit UN(2) can be halved by passing the input/output through exclusive OR circuits XORin, XORout and XORBout of an exclusive OR logic with Bin as a criterion for control of inversion. In FIG. 4, UN(2) is a two-digit subtraction unit in which a truth table of two-digit subtraction of the upper half (A to P) of Table 2 in FIG. 3 is put.

In the example of the input/output in FIG. 4, since Bin has no borrowing from a lower digit, Bin=0 and all of the exclusive OR circuits XORin, XORout and XORBout are set to pass inputs without inverting the inputs. In addition, inputs of a minuend of first-digit, X0=0, a subtrahend of first-digit, Y0=1, a minuend of second-digit, X1=0, and a subtrahend of second-digit, Y1=1, that is, difference values of a subtraction equation of (00−11) of a binary, are "−01", and borrowing from an upper digit is required. This subtraction corresponds to "F" in the truth table of FIG. 2, and the two-digit subtraction unit UN(2) finds that borrowing from an upper digit, Bout=1, the upper digit, Out1=0, and a lower digit, Out0=1, and outputs them.

(2) Since the lowest-digit has no borrowing, a constant output "0110," which is determined only by a combination of the minuends X0 and Y0 of first-digit, is repeated.

Table 3 shown in FIG. 5 is to halve the truth table of Table 2 with emission of Bin according to the above-described method. Outputs are considered. When outputs are divided into four blocks, the lowest-digit (the rightmost output) Out0 is outputted with the same pattern "0110." In other words, since the output of Out0 is not subjected to borrowing, the same output is simply repeated.

(3) An upper output from the lowest-digit is also increased according to a certain rule.

Next, considering Out1 of second-digit of outputs of Table 3 in FIG. 5, with the reference of the uppermost block of "0100," the next block has an inversion "1011", the block after the next block has the same inversion "1011", and the lowest block has the reference "0100." That is, the blocks have a pattern of "reference", "inversion", "inversion", and "reference."

Finally, for the uppermost-digit Bout, the first and last blocks of this output are the same as Out1 next thereto. The second and third blocks are filled with 1 and 0, respectively, which is a difference from Out1. Accordingly, outputs of Bout can be simply obtained using a circuit to cause the output of the same circuit as Out1 to be "1" if the leftmost inputs X1 and Y1 are "01" and to be "0" if they are "10." Since these regularities can be applied even with increase of digits, the inputs/outputs can be simply predicted by dividing the output into the four blocks according to this method.

(4) Regularity of third or more-digit subtraction

Figure 6:
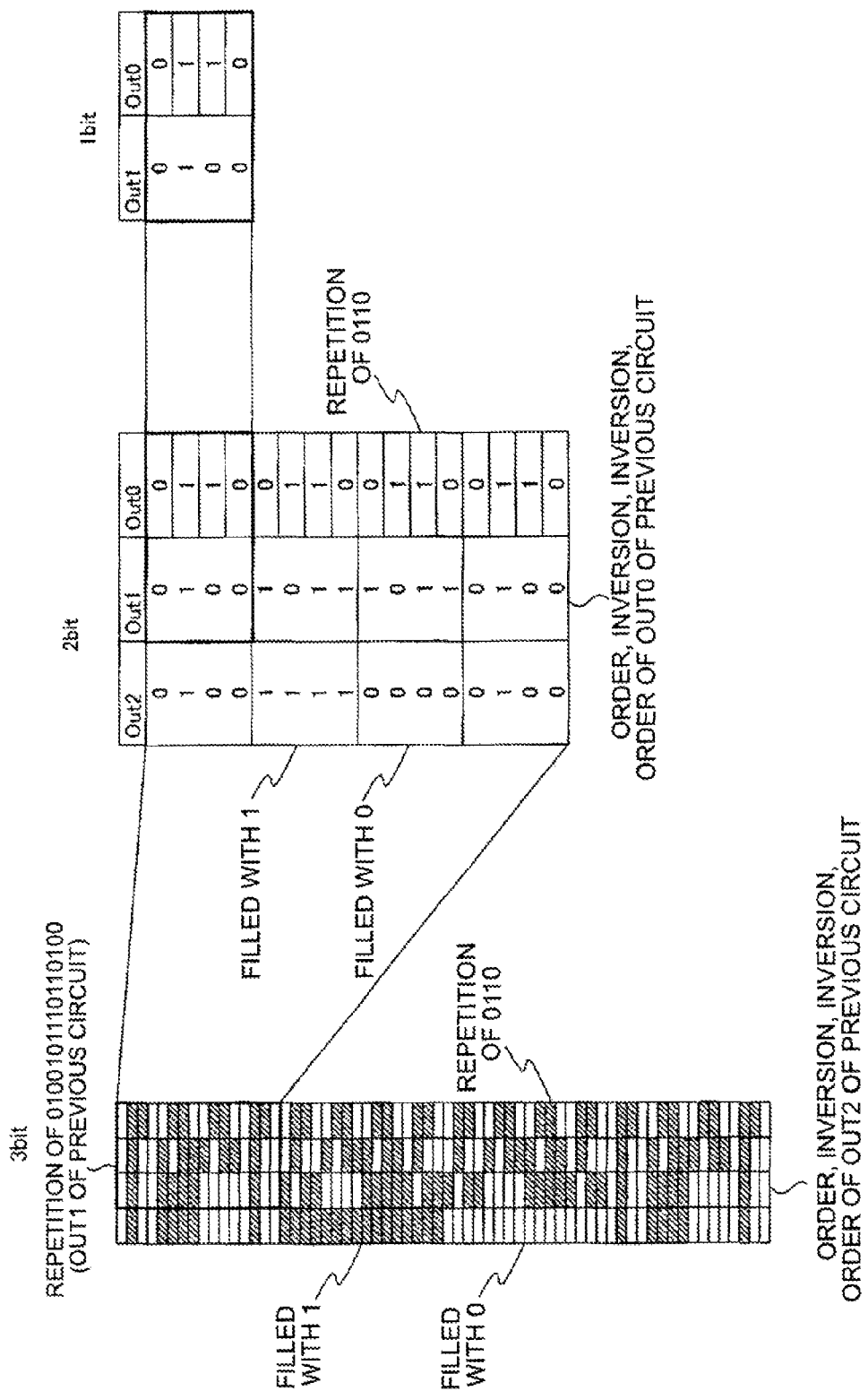
FIG. 6 is an explanatory view for the regularity of output values between one, two and three-digit subtracters.

Next, truth tables with increase of the number of digits of outputs like one, two and three, are compared. FIG. 6 shows the truth table focusing only the output. First, Out0 is outputted with repetition of "0110" irrespective of the number of digits. When the number of digits is increased by one, an output is horizontally increased by one. Since the entire output is vertically increased by four times, four blocks in the truth table for the previous two-digit subtraction becomes the first block of the truth table for the next three-digit subtraction. Succeeding outputs after the first blocks are determined according to the above-described rules. That is, an output Out1 of second-digit repeats the output Out1 of the two-digit subtracter four times. An output Out2 of third-digit has a pattern of order, inversion, inversion and order from top to bottom for the output Out2 of the two-digit subtracter. For the fourth uppermost-digit Bout, the first and last blocks of this output are the same as Out2 next thereto. The second and third blocks are filled with 1 and 0, respectively.

[Second Embodiment]

(5) Modularization of 8-digit subtracter

Figure 7:
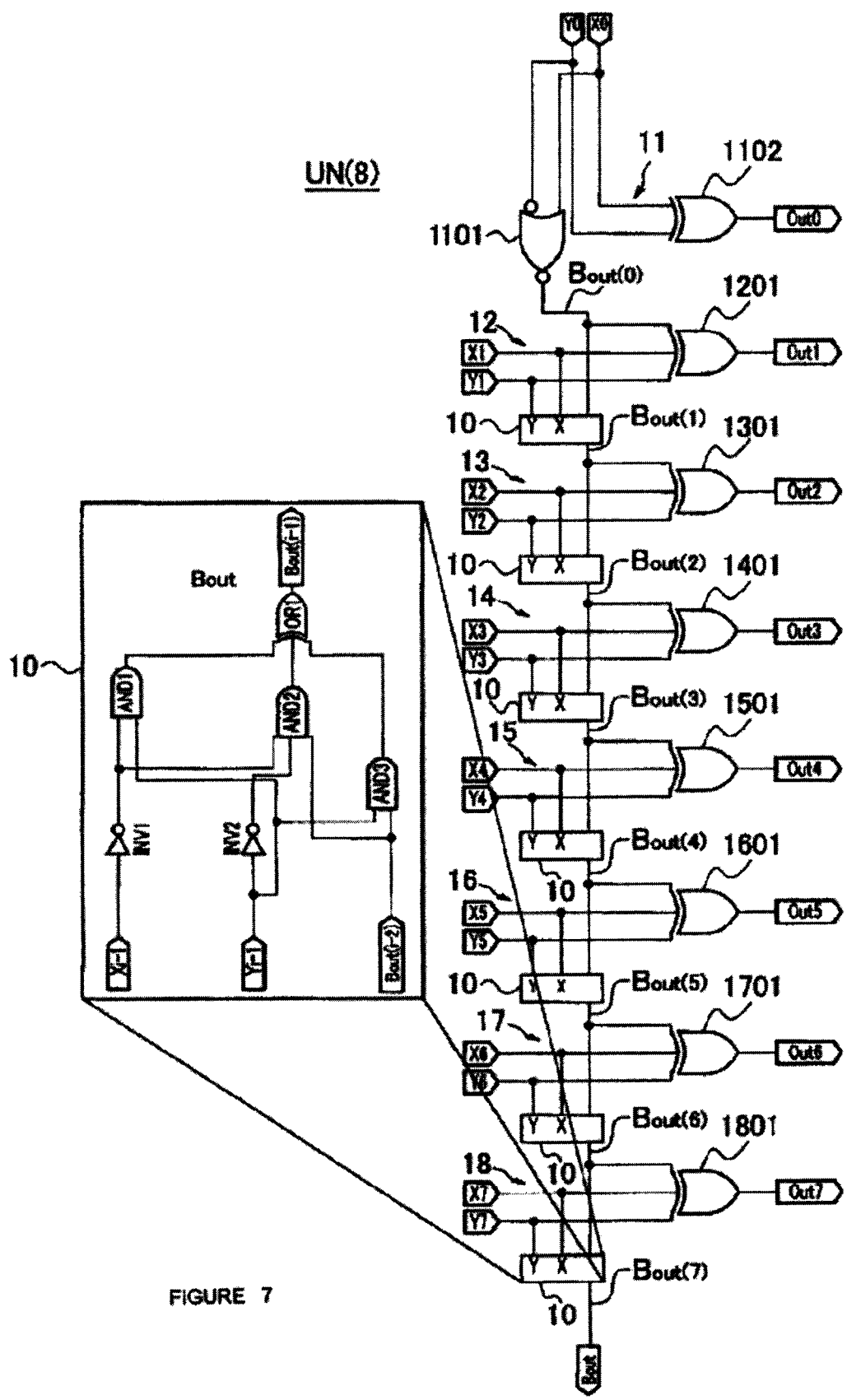
FIG. 7 is a block diagram of an eight-digit subtraction unit according to a second embodiment of the present invention.

FIG. 7 shows an 8-digit subtraction unit UN(8) configured using the above-described rules. In FIG. 7, a block denoted by reference numeral 10 is a borrowing circuit for outputting the borrowing Bout shown in Table 3 and is identical for seven 2 to 8-digit blocks. However, the 8-digit subtraction unit UN(8) does not include an inversion mechanism by the exclusive OR circuits and the borrowing input Bin, which are shown in FIG. 4.

The 8-digit subtraction unit UN(8) includes a first-digit subtraction circuit 11 including a logic circuit 1101 for outputting an upper borrowing output Bout(0) as 0, 1, 0 and 0 in order, to an upper second-digit for combinations (0,0), (0,1), (1,0) and (1,1), of inputs of a first-digit minuend X0 and a first-digit subtrahend Y0, and an exclusive OR circuit 1102 for outputting 0, 1, 1 and 0 as first-digit outputs Out0 in order in an exclusive OR logic for combinations (0,0), (0,1), (1,0) and (1,1), of inputs of the first-digit minuend X0 and the first-digit subtrahend Y0.

In addition, the 8-digit subtraction unit UN(8) includes a second-digit subtraction circuit 12 including a borrowing circuit 10 for outputting 1 for borrowing from the third-digit and 0 for no borrowing from the third-digit as upper borrowing outputs Bout(1) in order of 0, 1, 1, 1, 0, 0, 0, 1 for combinations (0,0,0), (0,0,1), (0,1,0), ..., (1,1,0), and (1,1,1) of inputs of a second-digit minuend X1 and a second-digit subtrahend Y1 and an input of a borrowing bit to input 1 for the borrowing output BoutO from lower first digit and 0 for no borrowing output BoutO, and a 3-input exclusive OR circuit 1201 for outputting a second-digit output Out1, which is an exclusive OR logic, with inputs of the second-digit minuend X1, the second-digit subtrahend Y1 and the borrowing output Bout(0) from a logic circuit 111 which is a lower first-digit borrowing circuit.

In addition, the 8-digit subtraction unit UN(8) includes third to eighth-digit subtraction circuits 13 to 18 like 2-digit subtraction circuit 12, each including for is 3 to 8, a borrowing circuit 10 for outputting 1 for borrowing from an upper $(i+1)^{th}$-digit and 0 for no borrowing from the upper $(i+1)^{th}$-digit as upper borrowing outputs Bout(i−1) in order of 0, 1, 1, 1, 0, 0, 0, 1 for combinations (0,0,0), (0,0,1), (0,1,0), ..., (1,1,0), and (1,1,1) of inputs of an $i^{th}$-digit minuend Xi−1 and an $i^{th}$-digit subtrahend Yi−1 and an input of a borrowing bit to input 1 for a borrowing output Bout (i−2) from the borrowing circuit 10 of a lower $(i−1)^{th}$-digit and 0 for no borrowing output Bout (i−2), and a 3-input exclusive OR circuit 1301 to 1801 for outputting an $i^{th}$-digit output Outi−1, which is an exclusive OR logic, with inputs of the $i^{th}$-digit minuend Xi−1, the $i^{th}$-digit subtrahend Yi−1 and the borrowing output Bout(i−2) from the borrowing circuit 10 of the lower $(i−1)^{th}$-digit.

For seven digits from second-digit to eighth-digit, 7 upper-digit subtraction circuits 12 to 18 are cascaded, the first-digit subtraction circuit 11 is connected to the second-digit subtraction circuit 12 such that the output Bout(0) of the logic circuit 1101 in the first-digit subtraction circuit 11 becomes a borrowing bit input of the borrowing circuit 10 in the second-digit subtraction circuit 12, and a borrowing output Bout(7) of a borrowing circuit in the upper eighth-digit subtraction circuit 18 becomes an borrowing output Bout of the 8-digit subtraction unit UN(8).

Figure 8:
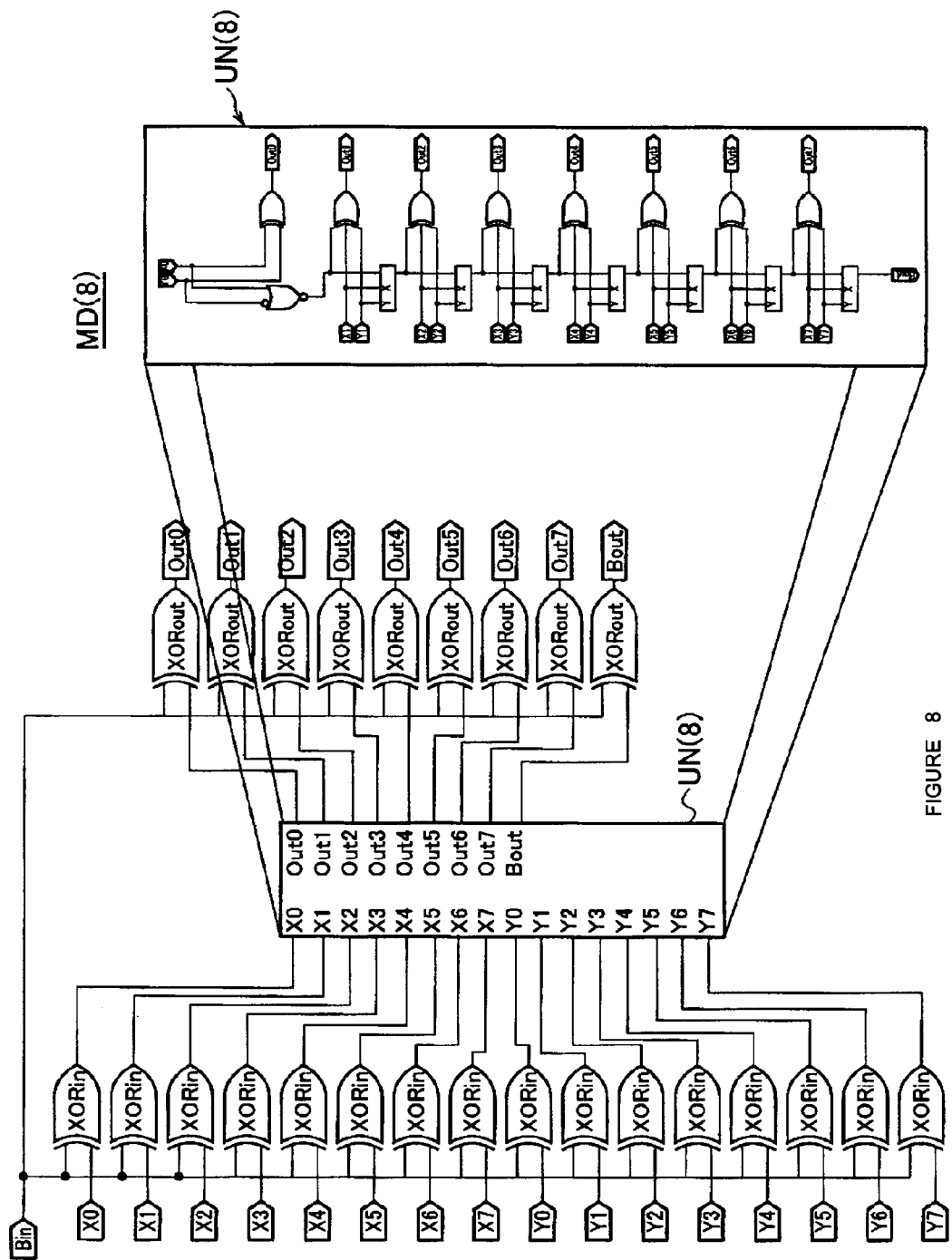
FIG. 8 is a block diagram of an eight-digit subtraction module according to the second embodiment of the present invention.

FIG. 8 shows a 8-digit subtraction module MD(8) configured using the 8-digit subtraction unit UN(8). As described above, a center block is the 8-digit subtraction unit UN(8) shown in FIG. 7. Since the circuits in the 8-digit subtraction unit UN(8) correspond to the upper half of the truth table, the 8-digit subtraction module MD(8) further includes an inversion mechanism including exclusive OR circuits XORin each taking exclusive OR of a borrowing input Bin from a lower digit and a minuend Xi−1 and a subtrahend Yi−1 of each $i^{th}$-digit (i is 1 to 8), exclusive OR circuits XORout each taking exclusive OR of the borrowing input Bin from the lower digit and a difference value output Outi−1 of each digit, and exclusive OR circuits XORBout taking exclusive OR of the borrowing input Bin from the lower digit and an upper digit borrowing bit output Bout. In addition, the minuend Xi−1 and subtrahend Yi−1 of each $i^{th}$-digit of the 8-digit subtraction unit UN(8) are those which passed the above exclusive OR circuits XORin. Likewise, the difference value output Outi−1 of each $i^{th}$-digit of the 8-digit subtraction unit UN(8) is passed the exclusive OR circuits XORout and its result is set as a difference value output Outi−1 of the 8-digit subtraction module MD(8).

With the 8-digit subtraction unit UN(8) shown in FIG. 7 and the 8-digit subtraction module MD(8) shown in FIG. 8 using the same according to this embodiment, it is possible to construct a subtracter in which digits, the number of which is proportional to the number of bits as the carry propagation scheme by modularization, are cascaded.

[Third Embodiment]

Figure 9:
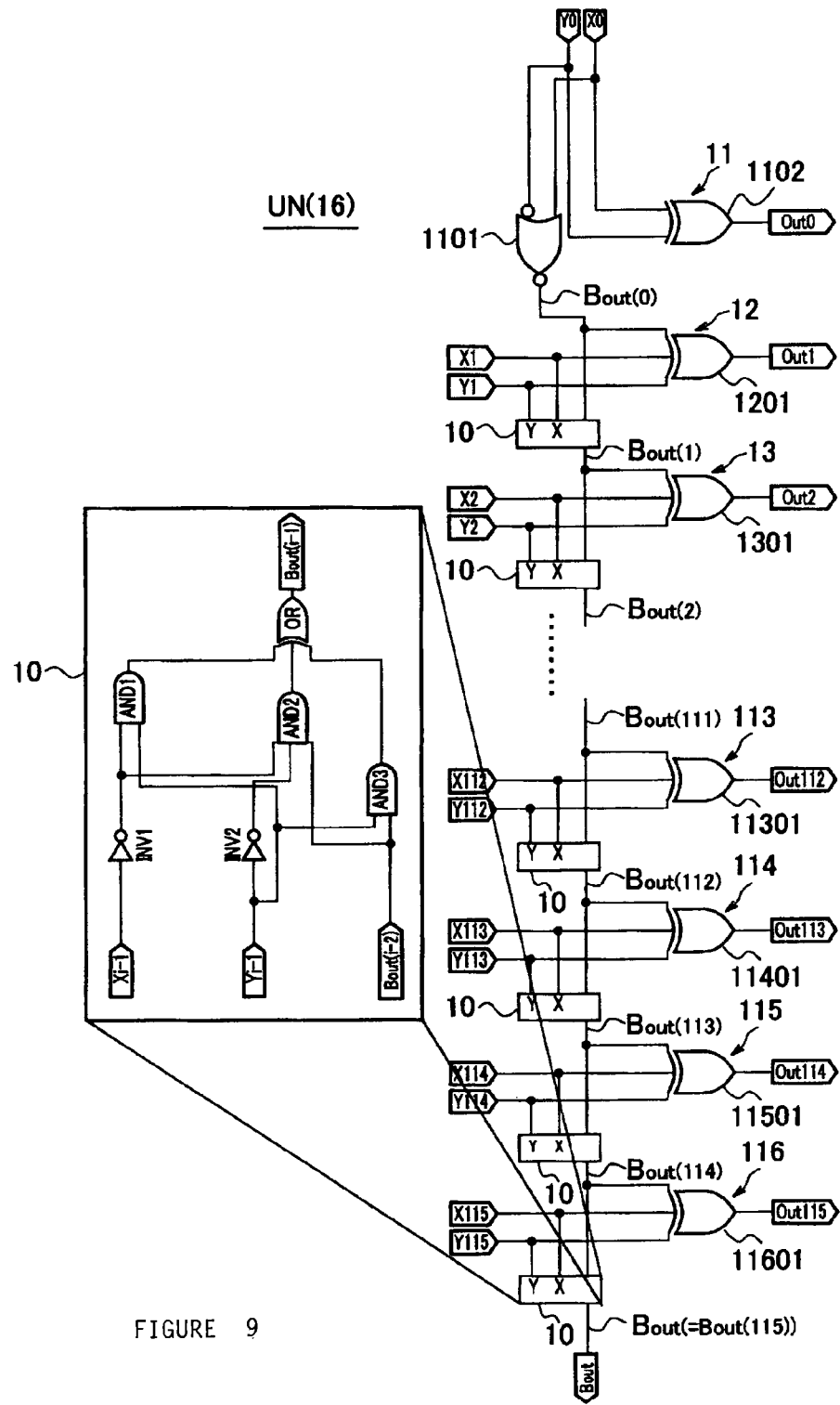
FIG. 9 is a block diagram of an N(=16)-digit subtraction unit according to a third embodiment of the present invention.

A third embodiment of the present invention provides generalization of the two-digit subtraction unit and the two-digit subtraction module, that is, an N-digit subtraction unit and an N-digit subtraction module. FIG. 9 shows an 16-digit subtraction unit UN(16) (N=16) and FIG. 10 shows a 16-digit subtraction module MD(16) using the same.

In the 16-digit subtraction unit UN(16) shown in FIG. 9, reference numeral 11 denotes a circuit configured with a logic circuit 1101 and an exclusive OR circuit 1102 like the first-digit subtraction circuit 11 in the 8-digit subtraction unit UN(8) according to the second embodiment shown in FIG. 7. Reference numerals 12, 13, ..., 1i, ..., 116 denote circuits each configured with a borrowing circuit 10 and a 3-input exclusive OR circuit 1201, 1301, ..., 1i01, ..., 11601, like the second to eighth-digit subtraction circuits 12, 13, ..., 18 in the 8-digit subtraction unit UN(8). In addition, even in cases where N is more than 16, N−1 subtraction circuits 1i are cascaded.

Figure 10:
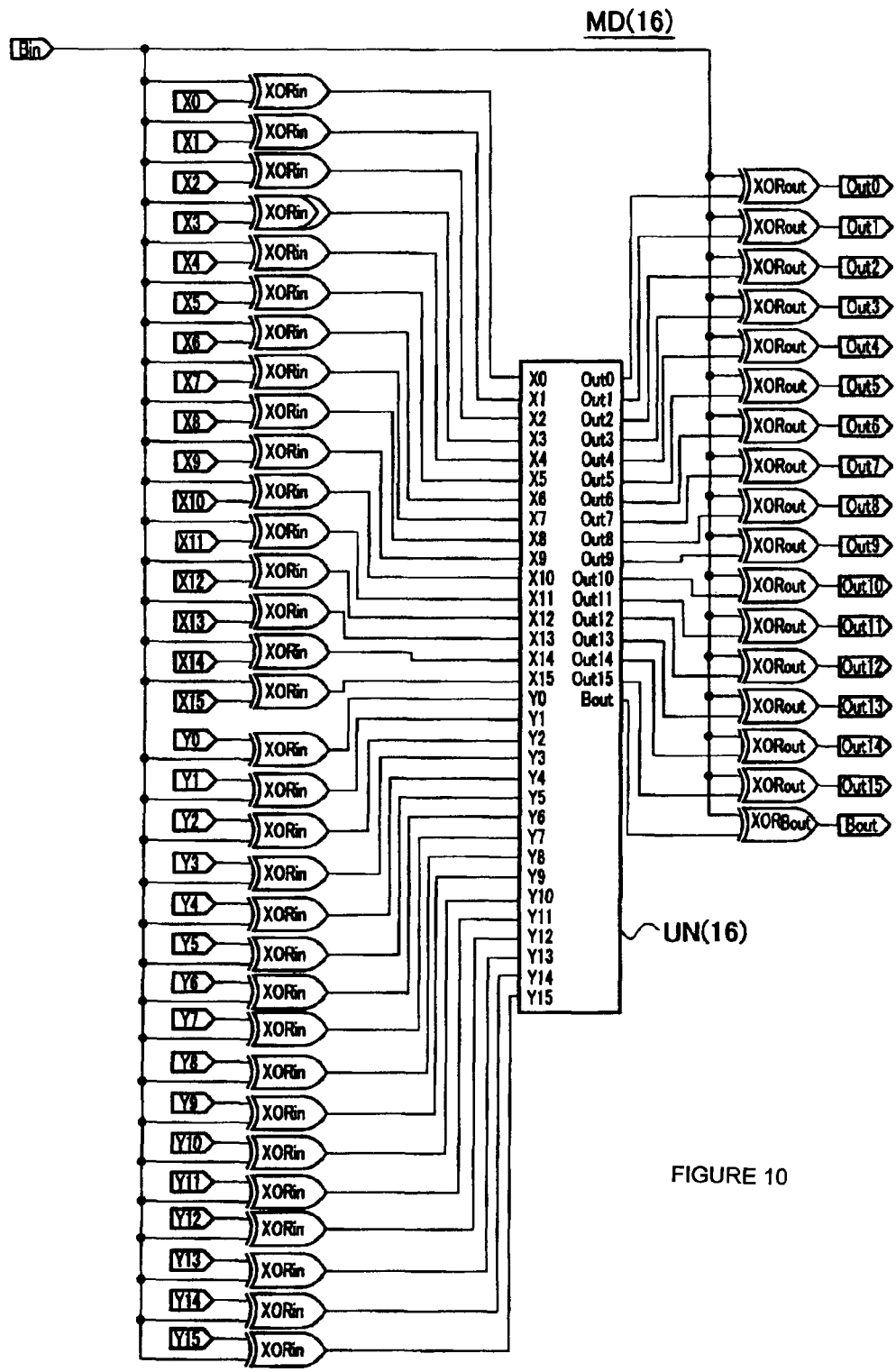
FIG. 10 is a block diagram of an N(=16)-digit subtraction module according to the third embodiment of the present invention.

In the 16-digit subtraction module MD(16) shown in FIG. 10, a center block is the 16-digit subtraction unit UN(16) shown in FIG. 9. Since the circuits in the 16-digit subtraction unit UN(16) correspond to the upper half of the truth table, the 16-digit subtraction module MD(16) further includes an inversion mechanism including exclusive OR circuits XORin each taking exclusive OR of a borrowing input Bin from a lower digit and a minuend Xi−1 and a subtrahend Yi−1 of each $i^{th}$-digit (i is 1 to 16), exclusive OR circuits XORout each taking exclusive OR of the borrowing input Bin from the lower digit and a difference value output Outi−1 of each digit, and exclusive OR circuits XORBout taking exclusive OR of the borrowing input Bin from the lower digit and an upper digit borrowing bit output Bout. In addition, the minuend Xi−1 and subtrahend Yi−1 of each $i^{th}$-digit of the 16-digit subtraction unit UN(16) are those which passed the above exclusive OR circuits XORin. Likewise, the difference value output Outi−1 of each $i^{th}$-digit of the 16-digit subtraction unit UN(16) is passed the exclusive OR circuits XORout and its result is set as a difference value output Outi−1 of the 16-digit subtraction module MD(16).

With the 16-digit subtraction unit UN(16) shown in FIG. 9 and the 16-digit subtraction module MD(16) shown in FIG. 10 using the same according to this embodiment, it is possible to construct a subtracter in which digits, the number of which is proportional to the number of bits as the carry propagation scheme by modularization, are cascaded.

If N is any integer, as can be inferred from the relation between the 8-digit subtraction unit UN(8) and the 16-digit subtraction unit UN(16) and the relation between the 8-digit subtraction module MD(8) and the 16-digit subtraction unit MD(16), an N-digit subtraction unit UN(N) and an N-digit subtraction module may be constructed as will be described below.

[Fourth Embodiment]
<N-Digit Subtraction Unit UN(N)>

A first-digit subtraction circuit 11 includes a logic circuit 1101 for outputting an upper borrowing output Bout(0) as 0, 1, 0 and 0 in order, to an upper second-digit for combinations (0,0), (0,1), (1,0) and (1,1), of inputs of a first-digit minuend X0 and a first-digit subtrahend Y0, and an exclusive OR circuit 1102 for outputting 0, 1, 1 and 0 as first-digit outputs Out0 in order in an exclusive OR logic for combinations (0,0), (0,1), (1,0) and (1,1), of inputs of the first-digit minuend X0 and the first-digit subtrahend Y0. An $i^{th}$-digit subtraction circuit 1i includes a borrowing circuit 10 for outputting 1 for borrowing from an upper $(i+1)^{th}$-digit and 0 for no borrowing from the $(i+1)^{th}$-digit as upper borrowing outputs Bout(i−1) in order of 0, 1, 1, 1, 0, 0, 0, 1 for combinations (0,0,0), (0,0,1), (0,1,0), ..., (1,1,0), and (1,1,1) of inputs of an $i^{th}$-digit minuend Xi−1 and an $i^{th}$-digit subtrahend Yi−1 (i is 2 or more) and an input of a borrowing bit to input 1 for the borrowing output Bout(i−2) from a lower $(i−1)^{th}$-digit and 0 for no borrowing output Bout(i−2), and a 3-input exclusive OR circuit 1i01 for outputting an $i^{th}$-digit output Outi−1, which is an exclusive OR logic, with inputs of the $i^{th}$-digit minuend Xi−1, the $i^{th}$-digit subtrahend Yi−1 and the borrowing output Bout (i−2) from the borrowing circuit 10 of the lower $(i−1)^{th}$-digit. In addition, for (N−1) digits from second-digit to $N^{th}$-digit, (N−1) $i^{th}$-digit subtraction circuits 12, 13, ..., 1i, ..., 1N are cascaded, the first-digit subtraction circuit 11 is connected to the second-digit subtraction circuit 12 such that the output Bout(0) in the first-digit subtraction circuit 11 becomes a borrowing bit input of the borrowing circuit 10 in the second-digit subtraction circuit 12, and an upper borrowing output Bout(N−1) in the $N^{th}$-digit subtraction circuit 1N becomes a borrowing output Bout of the N-digit subtraction unit UN(N).

<N-Digit Subtraction Module MD(N)>

It is configured with the above N-digit subtraction unit UN(N), 2N input side exclusive OR circuits XORin, each of which has each of an $i^{th}$-digit minuend Xi−1 and an $i^{th}$-digit subtrahend Yi−1 (i is 1 to N) as one input and a borrowing bit input Bin provided to a borrowing terminal from the outside as the other input and whose exclusive OR output becomes an input of the minuend Xi−1 and subtrahend Yi−1 of the N-digit subtraction unit UN(N), and output side exclusive OR circuits XORout and XORBout, each of which has each of an $i^{th}$-digit output Outi−1 and an upper digit borrowing output Bout(i−1) of the N-digit subtraction unit UN(N) as one input and a borrowing bit input Bin provided to a borrowing terminal from the outside as the other input and whose exclusive OR output becomes the output Outi−1 and Bout(i−1) of borrowing bits from the $i^{th}$-digit and upper-digits.

With the above N-digit subtraction unit UN(N) and the above N-digit subtraction module MD(N) using the same, it is possible to construct a subtracter in which digits, the number of which is proportional to the number of bits as the carry propagation scheme by modularization, are cascaded.

[Fifth Embodiment]

An N-digit addition unit ADU(N) and an N-digit addition module ADM(N) using the same according to a fifth embodiment of the present invention will be now described with reference to FIGS. 11 to 14.

<Relation Between Input and Output in Two-Digit Addition>

The following regularities may be found from observation of a truth table for two-digit addition, as shown in Table 4 of FIG. 11.

(1) Carrying of input and output of an adder is all inverted into "0" or "1."

Symbols A to P are allocated to portions where carrying Cin from a lower digit of input/output in Table 4 is 0. Next, in symmetry thereto, symbols P' to A' are allocated to portions where carrying Cin is 1. At this point, when viewing input/output two by two from the center in vertical symmetry, it can be seen that input/output each has a bit-inversion relation. One example may be given as follows.

P= 0 1 1 1 1 1 1 0

P'=1 0 0 0 0 0 0 1        [Mathematical Expression 2]

Accordingly, since the lower half of Table 4 may be obtained by inversion of the upper half thereof and carrying Cin from a lower digit is divided into 0 and 1, a scale of the truth table can be halved by passing the input/output through exclusive OR circuits with Cin as a criterion for control of inversion.

(2) Since the lowest-digit has no carrying, a constant output is repeated.

Table 5 of FIG. 12 is to halve the truth table with emission of Cin according to the above-described method. When outputs are divided into four blocks, the lowest-digit Out0 is outputted with the same pattern. In other words, since the output of Out0 is not subjected to carrying, the same output is simply repeated.

(3) An upper output from the lowest-digit is also increased according to a certain rule.

Next, considering a second-digit Out1 of outputs of Table 5 in FIG. 12, with the reference of the uppermost block of "0001," the next block has an inversion "1110", the block after the next block has the same inversion "1110", and the lowest block has the reference "0001." That is, the blocks have a pattern of "reference", "inversion", "inversion", and "reference."

Finally, for carrying Cout to an upper-digit, the first and last blocks of this output are filled with 0 and 1, respectively. The second and third blocks have inverted outputs of Out1. Accordingly, for the second and third blocks, outputs of Cout can be simply obtained using the same circuit as Out1 and passing its output through a inverting circuit.

Since these regularities can be applied even with increase of digits, the inputs/outputs can be simply predicted by dividing the output into the four blocks according to this method.

Figure 13:
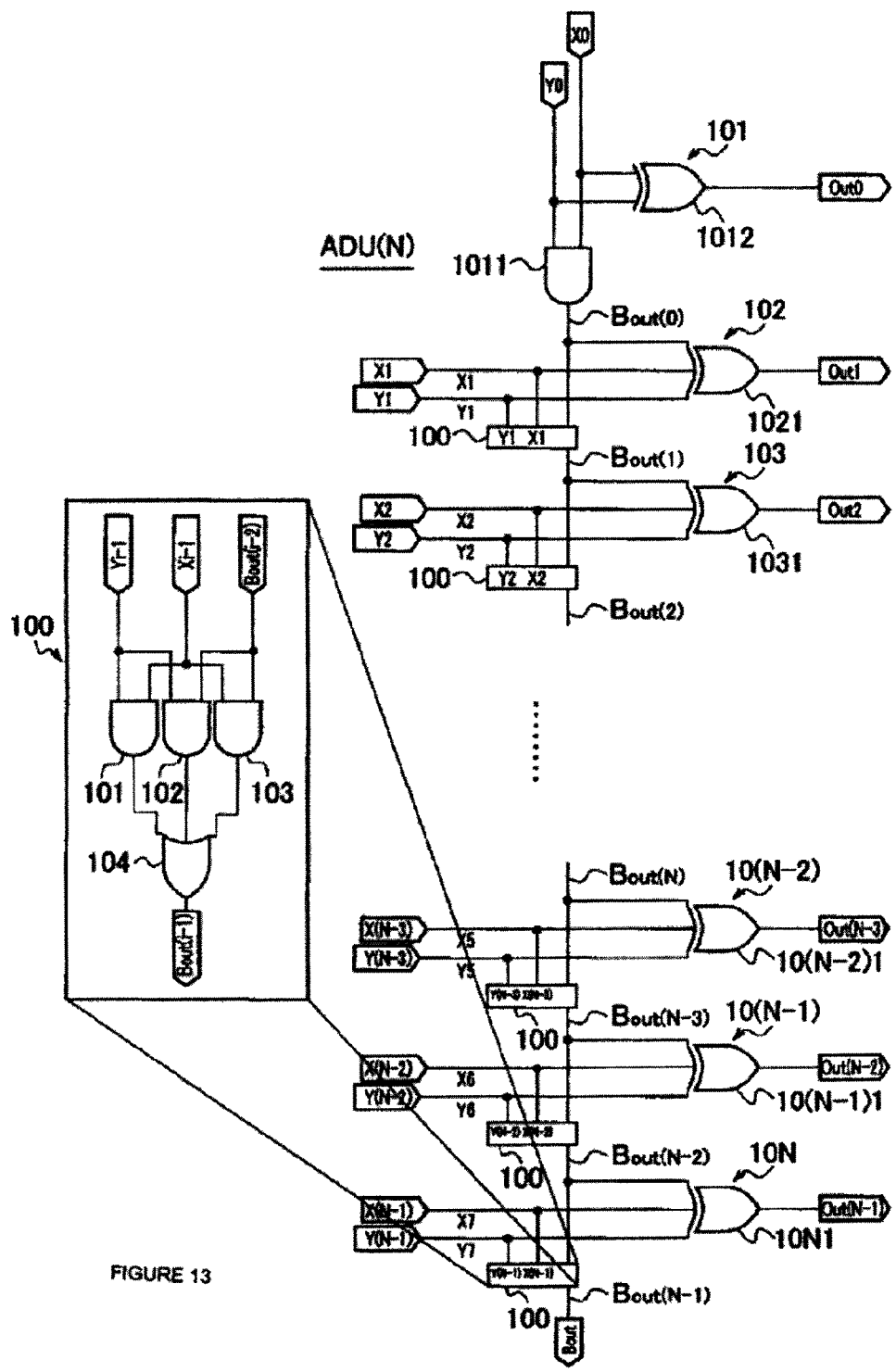
FIG. 13 is a block diagram of an N-digit addition unit according to a fifth embodiment of the present invention.
Figure 14:
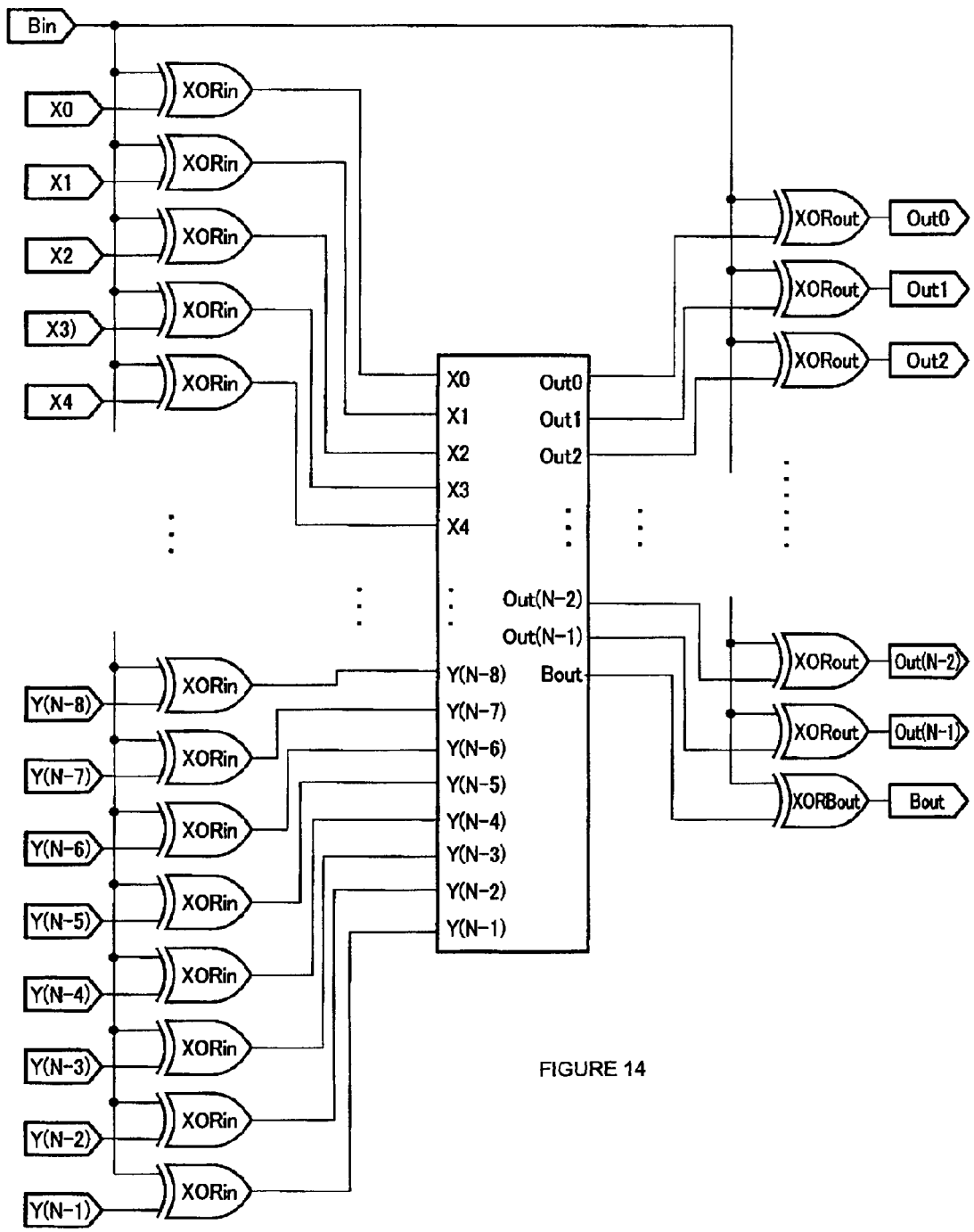
FIG. 14 is a block diagram of an N-digit addition module according to the fifth embodiment of the present invention.

FIG. 13 shows an N-digit addition unit ADU(N) and FIG. 14 shows an N-digit addition module ADM(N) using the same.

The N-digit addition unit ADU(N) includes a first-digit addition circuit 101 including an AND circuit 1011 for outputting an upper carrying output Bout(0) of 0, 0, 0 and 1 in order, to an upper second-digit in an AND logic for combinations (0,0), (0,1), (1,0) and (1,1), of inputs of a first-digit augend X0 and a first-digit addend Y0, and an exclusive OR circuit 1012 for outputting 0, 1, 1 and 0 as first-digit outputs Out0 in order in an exclusive OR logic for combinations (0,0), (0,1), (1,0) and (1,1), of inputs of the first-digit augend X0 and the first-digit addend Y0.

The N-digit addition unit ADU(N) includes an $i^{th}$-digit adder circuit $10i$ including a carrying circuit 100 for outputting 1 for carrying to an upper $(i+1)^{th}$-digit and 0 for no carrying to the $(i+1)^{th}$-digit as upper carrying outputs Bout (i−1) in order of 0, 0, 0, 1, 0, 1, 1, 1 for combinations (0,0,0), (0,0,1), (0,1,0), ..., (1,1,0), and (1,1,1) of inputs of an $i^{th}$-digit augend Xi−1 and an $i^{th}$-digit addend Yi−1 (i is 2 to N) and an input of a carrying bit to input 1 for the carrying output Bout(i−2) from a lower $(i−1)^{th}$-digit and 0 for no carrying output Bout(i−2), and a 3-input exclusive OR circuit $10i1$ for outputting an $i^{th}$-digit output Outi−1, which is an exclusive OR logic, with inputs of the $i^{th}$-digit augend Xi−1, the $i^{th}$-digit addend Yi−1 and the carrying output Bout(i−2) from the carrying circuit 100 of the lower $(i−1)^{th}$-digit. In addition, for (N−1) digits from second-digit to $N^{th}$-digit, (N−1) $i^{th}$-digit addition circuits 102, 103, ..., $10i$, ..., 10(N−1), 10N are cascaded, the first-digit addition circuit 101 is connected to the second-digit addition circuit 102 such that the output Bout(0) in the first-digit addition circuit 101 becomes a carrying bit input of the carrying circuit 100 in the second-digit addition circuit 102, and an upper carrying output Bout(N−1) in the $N^{th}$-digit addition circuit becomes a carrying output Bout of the N-digit addition unit ADU(N).

In addition, as shown in an enlarged portion in FIG. 13, the carrying circuit 100 of each digit includes AND circuits 101, 102 and 103 and a 3-input OR circuit 104.

As shown in FIG. 14, an N-digit addition module ADD(N) using the above-configured N-digit addition unit ADU(N) includes the N-digit addition unit ADU(N) and further includes 2N input side exclusive OR circuits XORin, each of which has each of an $i^{th}$-digit augend Xi−1 and an $i^{th}$-digit addend Yi−1 (i is 1 to N) as one input and a carrying bit input Bin provided to a carrying terminal from the outside as the other input and whose exclusive OR output becomes an input of the augend Xi−1 and addend Yi−1 of the N-digit addition unit ADU(N), and output side exclusive OR circuits XORout and XORBout, each of which has each of an $i^{th}$-digit output Outi−1 and an upper digit carrying output Bout of the N-digit addition unit ADU(N) as one input and a carrying bit input Bin provided to a carrying terminal from the outside as the other input and whose exclusive OR output becomes the output Outi−1 and Bout of carrying bits to the $i^{th}$-digit and upper-digits.

With the above N-digit addition unit ADU(N) and the above N-digit addition module ADM(N), it is possible to construct an adder in which digits, the number of which is proportional to the same number of bits as the carry propagation scheme by modularization, are cascaded, like the above subtraction unit and the above subtraction module.

EXAMPLE 1

It was confirmed through simulation and trial manufacture by FPGA that modularization and cascaded connection of 8-bit subtracter circuits can increase the number of digits for the operation. The confirmation was made with FPGA Virtex4, xc4vlx60 available from Xilinx Company as a target device. ISE Foundation 9.1i available from Xilinx was used as a design tool and ModelSim XE III 6.2 g available from Mentor Graphics Company was used as a simulator.

Through the simulation in FPGA, its performance was compared with those of existing borrow propagation scheme and those of lookahead borrow scheme. Table 6 of FIG. 15 and Table 7 of FIG. 16 show that it is inferior to the lookahead borrow scheme but superior to the borrow propagation scheme in an execution speed and is fewer than the other two schemes in the number of gates. However, this is a result of measurement in FPGA and the borrow propagation scheme can be implemented with the least number of gates in mounting of NAND gates in semi-custom or full-custom.

Figure 17:
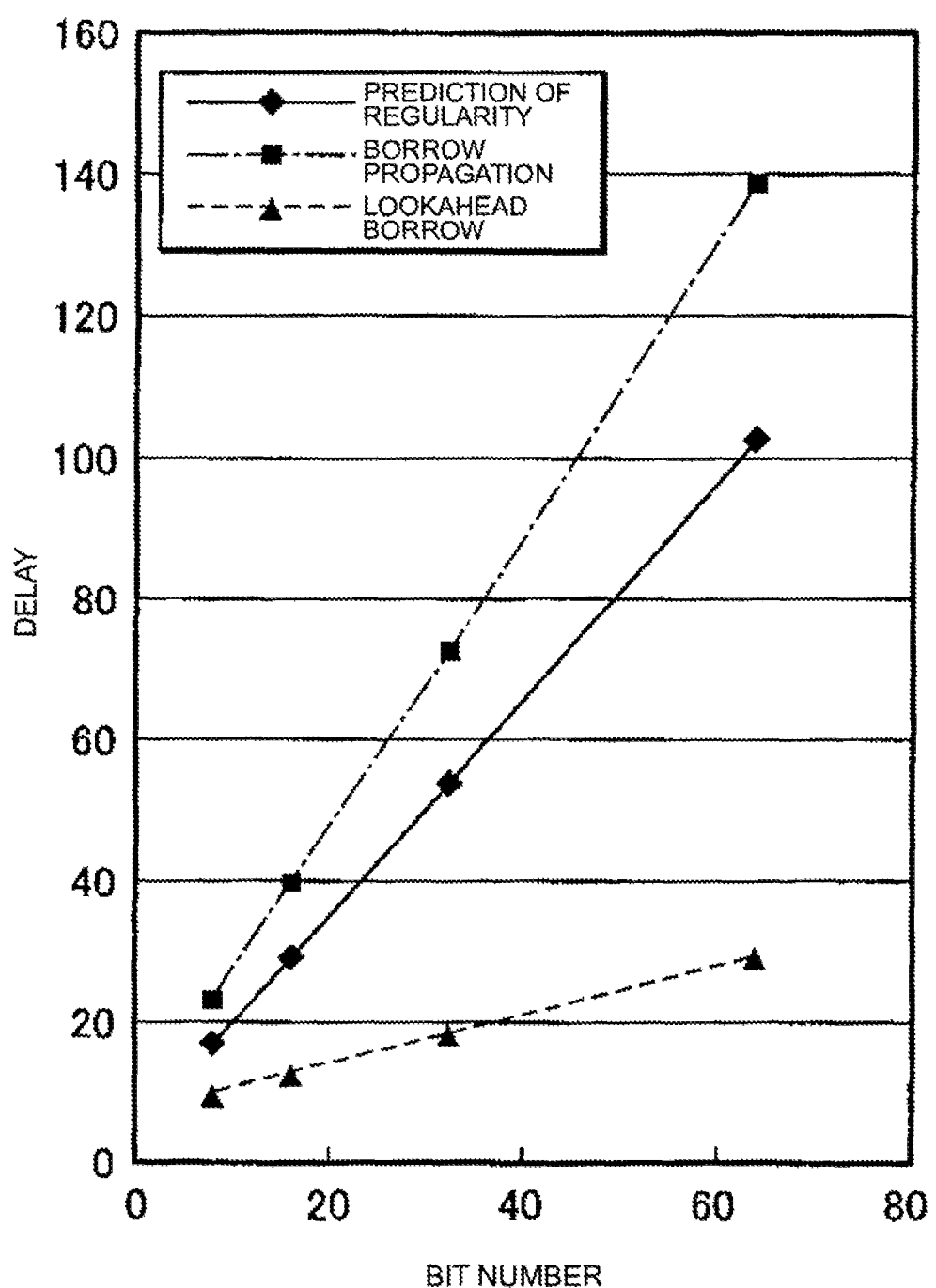
FIG. 17 is a graph showing comparison of delay of a subtracter according to an example of the present invention to a different subtracter.
Figure 18:
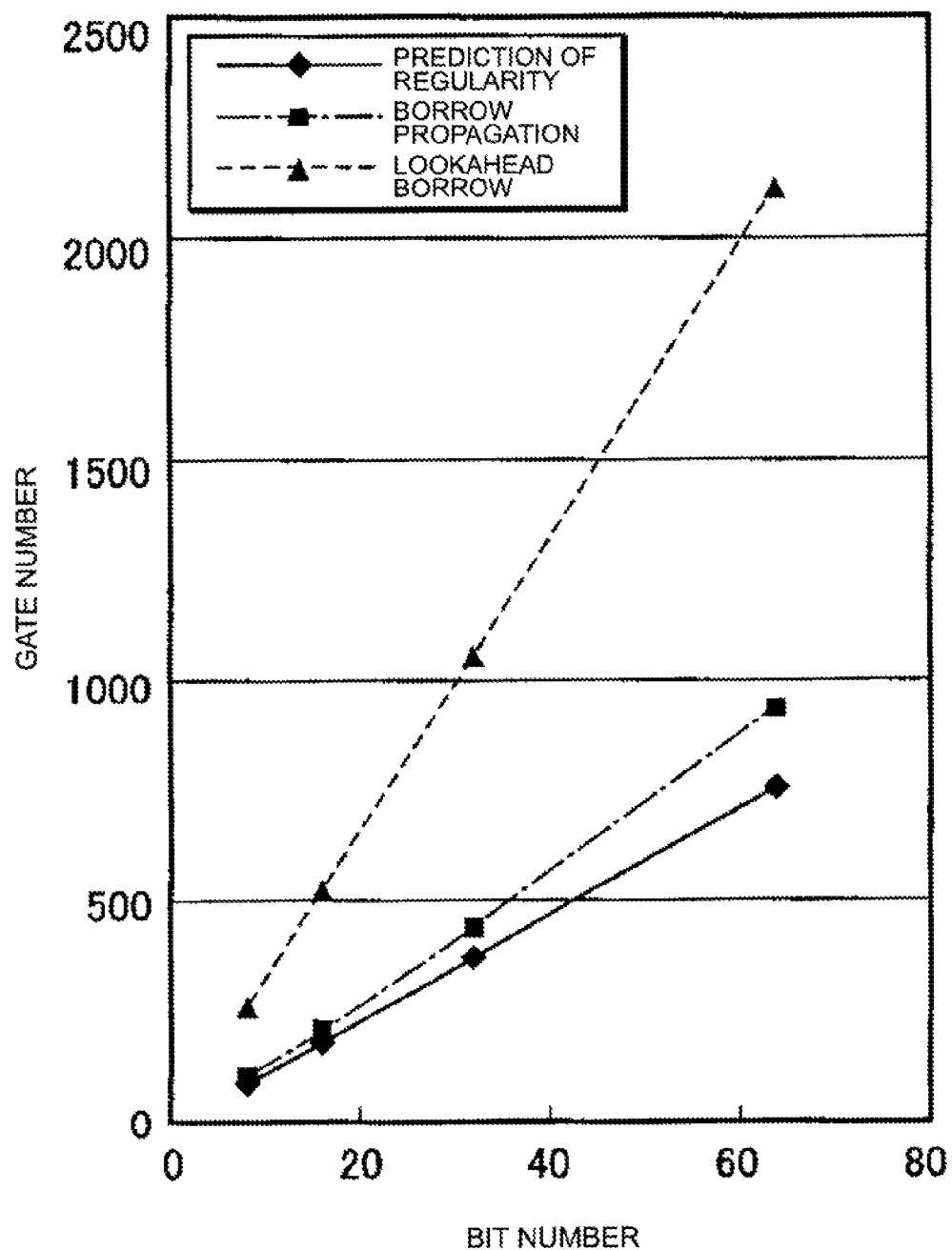
FIG. 18 is a graph showing comparison of the number of gates of a subtracter according to an example of the present invention to a different subtracter.

FIGS. 17 and 18 show graphs for respective results. From the graphs of both figures, it can be said that, since the difference of the number of gates becomes large with increase of the number of bits, the scheme of the present invention is effective for operation of multiple bits and suppression of the number of gates of multipliers/dividers which are multi-stages of adders/subtracters and can expect a high-speed operation. FIGS. 17 and 18 show a characteristic of a result of configuration of plural connections of 4-bit block lookahead borrowing in compliance with arithmetic bits, for example, of 16 blocks in a 64-bit operation. The other schemes also perform the same block (modularization).

Figure 21:
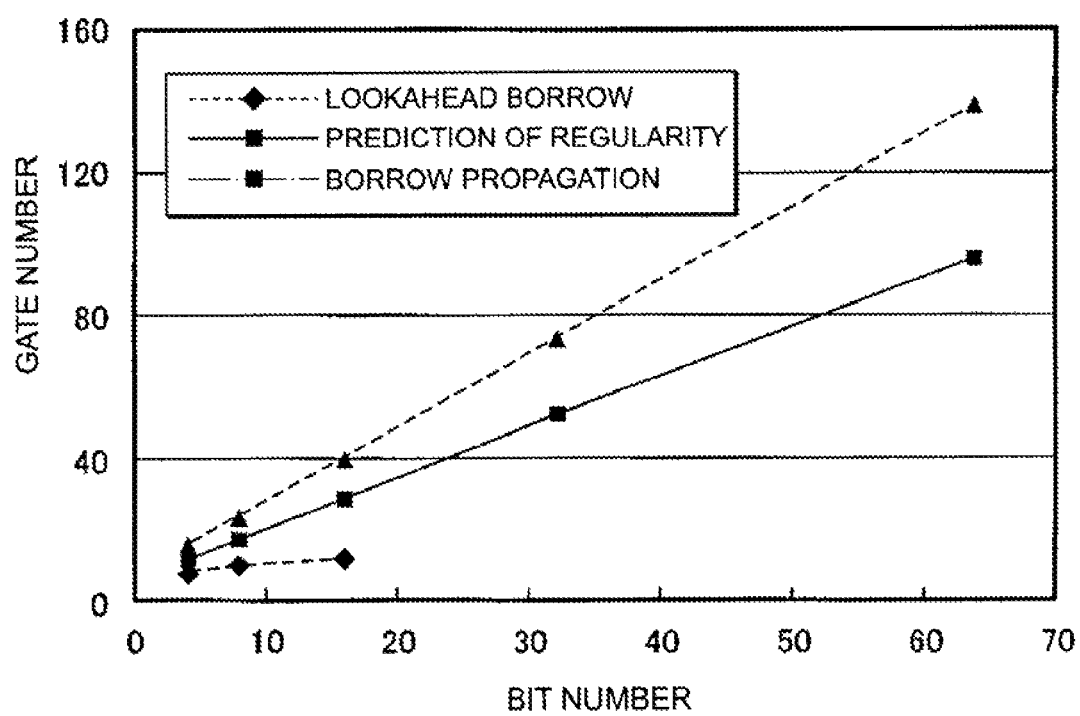
FIG. 21 is a graph showing comparison of delay of a subtracter according to an example of the present invention to a different subtracter in case of no modularization.
Figure 22:
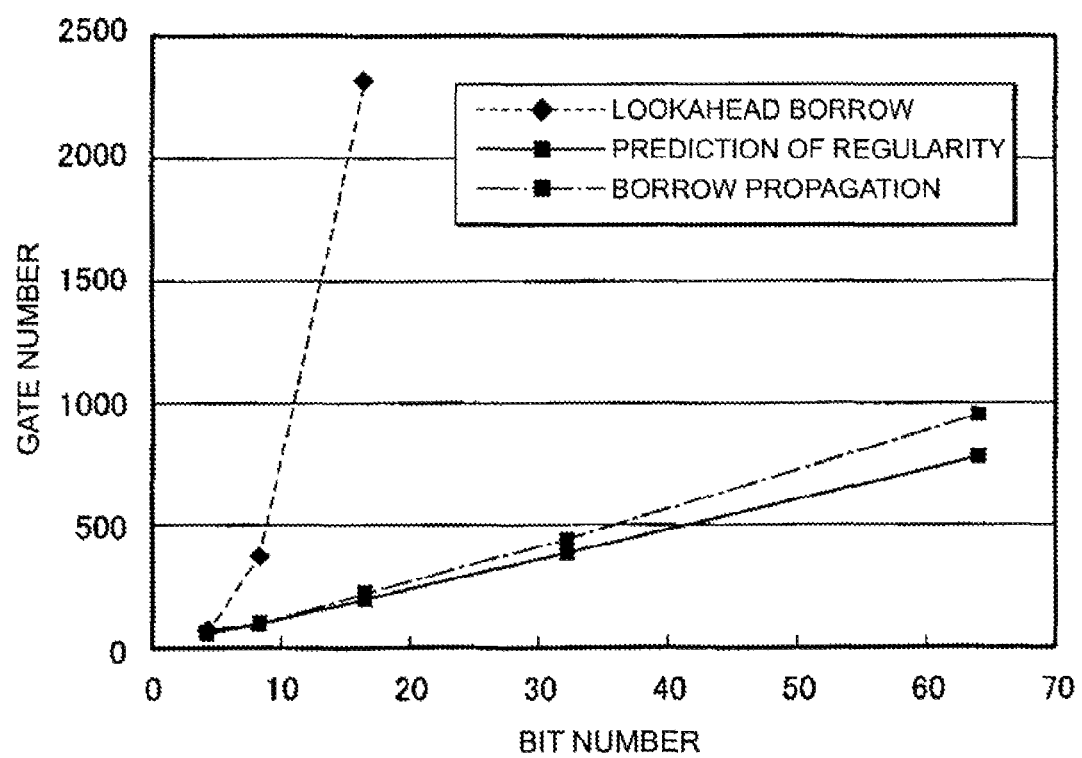
FIG. 22 is a graph showing comparison of the number of gates of a subtracter according to an example of the present invention to a different subtracter in case of no modularization.

Table 8 of FIG. 19, Table 9 of FIG. 20, a graph of FIG. 21 and a graph of FIG. 22 show comparison between 4-bit, 8-bit and 16-bit configuration of schemes, but with all schemes not being configured by blocks. As can be seen from both tables and graphs, although the borrow propagation scheme is not different from the case of modularization, the lookahead borrow scheme and the regularity prediction scheme of the present invention can achieve a higher speed. Regarding the number of gates, even in comparison for no modularization, the regularity prediction scheme of the present invention can be configured with fewer gates than the lookahead borrow scheme for 8-bit, and the regularity prediction scheme can greatly reduce the number of gates at modularization of any digits.

As described above, according to examples of the present invention, it is possible to make a design for prediction of regularity of outputs from an input pattern of subtraction data and suppression of borrowing propagation, thereby it is confirmed that the present invention achieves relatively-high operation speed and suppression of the number of gates and is suitable scheme for modularization.

Since the reduction of the number of gates leads to the reduction of power consumption, the present invention is suitable for high integration and multi-stage configuration and is useful for applications to multipliers/dividers for operating a number of times and operating multiple bits and applications to encryption processing and the like in that the design is suitable for modularization and suppression of the number of gates can be made.

What is claimed is:

1. An N-digit subtraction unit comprising:
   a first-digit subtraction circuit including:
      an input of a first-digit minuend;
      an input of a first-digit subtrahend;
      a logic circuit to output a first upper borrowing output to an upper-digit subtraction circuit for combinations of the first-digit minuend and the first-digit subtrahend; and
      a first-digit subtraction output corresponding to the combinations of the first-digit minuend and the first-digit subtrahend;
   at least one upper-digit subtraction circuit including:
      an input of an upper-digit minuend;
      an input of an upper-digit subtrahend;
      an input of a borrowing bit corresponding to the first upper borrowing output or a second upper borrowing output;
      a borrowing circuit to output an upper-digit borrowing output corresponding to combinations of the upper-digit minuend, the upper-digit subtrahend, and the borrowing bit, wherein the upper-digit borrowing output is generated by a first 3-input exclusive OR circuit that outputs exclusive OR combinations of the upper-digit minuend, the upper-digit subtrahend, and the borrowing bit, and wherein prior to being input to the first 3-input exclusive OR circuit:
         the upper-digit minuend is inverted prior to being input to a first 2-input AND circuit for combinations of the upper-digit minuend and the upper-digit subtrahend;
         the upper-digit subtrahend is inverted prior to being input to a 3-input AND circuit for the combinations of the upper-digit minuend, the upper-digit subtrahend, and the borrowing bit; and
         the borrowing bit is input to a second 2-input AND circuit for combinations of the upper-digit subtrahend and the borrowing bit; and
      an upper-digit subtraction output corresponding to the combinations of the upper-digit minuend, the upper-digit subtrahend, and the borrowing bit, wherein the upper-digit subtraction output is generated by a second 3-input exclusive OR circuit that outputs exclusive OR combinations of the upper-digit minuend, the upper-digit subtrahend, and the borrowing bit.

2. The N-digit subtraction unit according to claim 1, wherein N-digit subtraction is performed by coupling (N−1) upper-digit subtraction circuits to the first-digit subtraction circuit in a cascaded fashion.

3. The N-digit subtraction unit of claim 1, wherein the first upper borrowing output is generated by a NOR circuit that outputs 0, 1, 0 and 0, in order, for combinations (0,0), (0,1), (1,0) and (1,1), of the first-digit minuend and the first-digit subtrahend, wherein the first-digit subtrahend is inverted prior to being input to the NOR circuit.

4. The N-digit subtraction unit of claim 1, wherein the first-digit subtraction output is generated by a third exclusive OR circuit that outputs 0, 1, 1 and 0, in order, for combinations, (0,0), (0,1), (1,0) and (1,1), of the first-digit minuend and the first-digit subtrahend.

5. The N-digit subtraction unit of claim 1, wherein the upper-digit borrowing output is 0, 1, 1, 1, 0, 0, 0, 1, in order, for combinations, (0,0,0), (0,0,1), (0,1,0), (0,1,1), (1,0,0), (1,0,1), (1,1,0), and (1,1,1) of the upper-digit minuend, the upper-digit subtrahend, and the borrowing bit.

6. The N-digit subtraction module of claim 1, wherein, for (N−1) digits from a second-digit to an $N^{th}$-digit, (N−1) upper-digit subtraction circuits are cascaded, and the first-digit subtraction circuit is coupled to an upper-digit subtraction circuit corresponding to the second-digit such that the first upper borrowing output becomes a borrowing bit in the upper-digit subtraction circuit corresponding to the second-digit, and an upper borrowing output in an upper-digit subtraction circuit corresponding to the $N^{th}$-digit becomes a borrowing output of the N-digit subtraction unit.

7. A method comprising:
   receiving an input of a first-digit minuend;
   receiving an input of a first-digit subtrahend;
   outputting, with a first-digit subtraction circuit, a first upper borrowing output to an upper-digit subtraction circuit for combinations of the first-digit minuend and the first-digit subtrahend;
   generating a first-digit subtraction output corresponding to the combinations of the first-digit minuend and the first-digit subtrahend; and
   receiving an input of an upper-digit minuend;
   receiving an input of an upper-digit subtrahend;
   receiving an input of a borrowing bit corresponding to the first upper borrowing output or a second upper borrowing output;
   outputting, with a borrowing circuit of the upper-digit subtraction circuit, an upper-digit borrowing output corresponding to combinations of the upper-digit minuend, the upper-digit subtrahend, and the borrowing bit, wherein the upper-digit borrowing output is based on a first 3-input exclusive OR circuit that outputs exclusive OR combinations of the upper-digit minuend, the upper-digit subtrahend, and the borrowing bit, and wherein prior to being input to the first 3-input exclusive OR circuit:
      the upper-digit minuend is inverted prior to being input to a first 2-input AND circuit for combinations of the upper-digit minuend and the upper-digit subtrahend;
      the upper-digit subtrahend is inverted prior to being input to a 3-input AND circuit for the combinations of the upper-digit minuend, the upper-digit subtrahend, and the borrowing bit; and
      the borrowing bit is input to a second 2-input AND circuit for combinations of the upper-digit subtrahend and the borrowing bit; and
   generating an upper-digit subtraction output corresponding to the combinations of the upper-digit minuend, the upper-digit subtrahend, and the borrowing bit, wherein the upper-digit subtraction output is based on a second 3-input exclusive OR circuit that outputs exclusive OR combinations of the upper-digit minuend, the upper-digit subtrahend, and the borrowing bit.

8. The method of claim 7, further comprising coupling (N−1) upper-digit subtraction circuits to the first-digit subtraction circuit in a cascaded fashion.

9. The method of claim 7, wherein the first upper borrowing output is generated by a NOR circuit that outputs 0, 1, 0 and 0, in order, for combinations (0,0), (0,1), (1,0) and (1,1), of the first-digit minuend and the first-digit subtrahend, wherein the first-digit subtrahend is inverted prior to being input to the NOR circuit.

10. The method of claim 7, wherein the first-digit subtraction output is generated by a third exclusive OR circuit that outputs 0, 1, 1 and 0, in order, for combinations, (0,0), (0,1), (1,0) and (1,1), of the first-digit minuend and the first-digit subtrahend.

11. The method of claim 7, wherein the upper-digit borrowing output is 0, 1, 1, 1, 0, 0, 0, 1, in order, for combinations, (0,0,0), (0,0,1), (0,1,0), (0,1,1), (1,0,0), (1,0,1), (1,1,0), and (1,1,1) of the upper-digit minuend, the upper-digit subtrahend, and the borrowing bit.

12. The method of claim 7, further comprising:
cascading, for (N−1) digits from a second-digit to an $N^{th}$-digit, (N−1) upper-digit subtraction circuits; and
coupling the first-digit subtraction circuit to an upper-digit subtraction circuit corresponding to the second-digit such that the first upper borrowing output becomes a borrowing bit in the upper-digit subtraction circuit corresponding to the second-digit, and an upper borrowing output in an upper-digit subtraction circuits corresponding to the $N^{th}$-digit becomes a borrowing output of the N-digit subtraction unit.

13. A non-transitory computer-readable medium having instructions stored thereon, the instructions comprising:
instructions to control a first-digit subtraction circuit including:
instructions to accept an input of a first-digit minuend;
instructions to accept an input of a first-digit subtrahend;
instructions to output a first upper borrowing output to an upper-digit subtraction circuit for combinations of the first-digit minuend and the first-digit subtrahend; and
instructions to output a first-digit subtraction output corresponding to the combinations of the first-digit minuend and the first-digit subtrahend; and
instructions to control at least one upper-digit subtraction circuit including:
instructions to accept an input of an upper-digit minuend;
instructions to accept an input of an upper-digit subtrahend;
instructions to accept an input of a borrowing bit corresponding to the first upper borrowing output or a second upper borrowing output;
instructions to output an upper-digit borrowing output corresponding to combinations of the upper-digit minuend, the upper-digit subtrahend, and the borrowing bit, wherein the upper-digit borrowing output is based on a first 3-input exclusive OR circuit that outputs exclusive OR combinations of the upper-digit minuend, the upper-digit subtrahend, and the borrowing bit, and wherein prior to being input to the first 3-input exclusive OR circuit:
the upper-digit minuend is inverted prior to being input to a first 2-input AND circuit for combinations of the upper-digit minuend and the upper-digit subtrahend;
the upper-digit subtrahend is inverted prior to being input to a 3-input AND circuit for the combinations of the upper-digit minuend, the upper-digit subtrahend, and the borrowing bit; and
the borrowing bit is input to a second 2-input AND circuit for combinations of the upper-digit subtrahend and the borrowing bit; and
instructions to output an upper-digit subtraction output corresponding to the combinations of the upper-digit minuend, the upper-digit subtrahend, and the borrowing bit, wherein the upper-digit subtraction output is based on a second 3-input exclusive OR circuit that outputs combinations of the upper-digit minuend, the upper-digit subtrahend, and the borrowing bit.

14. The non-transitory computer-readable medium of claim 13, wherein the instructions to output the first upper borrowing output comprise instructions to output 0, 1, 0 and 0, in order, for NOR combinations (0,0), (0,1), (1,0) and (1,1), of the first-digit minuend and the first-digit subtrahend, wherein the first-digit subtrahend is inverted prior to being combined.

15. The non-transitory computer-readable medium of claim 13, wherein the instructions to output the first-digit subtraction output comprise instructions to output 0, 1, 1 and 0, in order, for combinations, (0,0), (0,1), (1,0) and (1,1), of the first-digit minuend and the first-digit subtrahend.

16. The non-transitory computer-readable medium of claim 13, wherein the instructions to output the upper-digit borrowing output comprise instructions to output 0, 1, 1, 1, 0, 0, 0, 1, in order, for combinations, (0,0,0), (0,0,1), (0,1,0), (0,1,1), (1,0,0), (1,0,1), (1,1,0), and (1,1,1) of the upper-digit minuend, the upper-digit subtrahend, and the borrowing bit.

17. The non-transitory computer-readable medium of claim 13, further comprising instructions, for (N−1) digits from a second-digit to an $N^{th}$-digit, to cascade (N−1) upper-digit subtraction circuits, wherein the first-digit subtraction circuit is coupled to an upper-digit subtraction circuit corresponding to the second-digit such that the first upper borrowing output becomes a borrowing bit in the upper-digit subtraction circuit corresponding to the second-digit, and an upper borrowing output in an upper-digit subtraction circuit corresponding to the $N^{th}$-digit becomes a borrowing output of an N-digit subtraction unit.

* * * * *

UNITED STATES PATENT AND TRADEMARK OFFICE
CERTIFICATE OF CORRECTION

PATENT NO. : 8,606,842 B2  
APPLICATION NO. : 12/196002  
DATED : December 10, 2013  
INVENTOR(S) : Kasahara et al.

Page 1 of 1

It is certified that error appears in the above-identified patent and that said Letters Patent is hereby corrected as shown below:

In the Specification

In Column 5, Line 37, delete "DESCRIPTION" and insert -- DETAILED DESCRIPTION --, therefor.

In Column 8, Line 11, delete "for is" and insert -- for i is --, therefor.

In the Claims

In Column 14, Line 15, in Claim 6, delete "module" and insert -- unit --, therefor.

Signed and Sealed this  
Twenty-ninth Day of April, 2014

Michelle K. Lee  
*Deputy Director of the United States Patent and Trademark Office*